United States Patent
Yamamoto et al.

(10) Patent No.: US 6,226,059 B1
(45) Date of Patent: *May 1, 2001

(54) ACTIVE MATRIX DISPLAY DEVICE USING ALUMINUM ALLOY IN SCANNING SIGNAL LINE OR VIDEO SIGNAL LINE

(75) Inventors: Hideaki Yamamoto, Tokorozawa; Haruo Matsumaru, Tokyo; Tetsuaki Suzuki, Mobara; Mitsuo Nakatani, Mobara; Michio Tsukii, Mobara; Akira Sasano, Tokyo; Saburo Oikawa, Hitachi; Ryoji Oritsuki, Chiba-ken, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/098,541

(22) Filed: Jun. 17, 1998

Related U.S. Application Data

(63) Continuation of application No. 08/725,256, filed on Oct. 4, 1996, now Pat. No. 5,781,255, which is a continuation of application No. 08/467,967, filed on Jun. 6, 1995, now Pat. No. 5,589,962, which is a continuation of application No. 08/072,966, filed on Jun. 8, 1993, now abandoned.

(30) Foreign Application Priority Data

Jun. 8, 1992 (JP) .................................................. 4-147120

(51) Int. Cl.⁷ ......................... G02F 1/136; G02F 1/1345
(52) U.S. Cl. ................................. 349/42; 349/43; 349/46; 349/48; 349/149; 349/152; 257/59; 437/40

(58) Field of Search ................................. 349/42, 43, 46, 349/48, 149, 152; 257/59; 437/40

(56) References Cited

U.S. PATENT DOCUMENTS

| 5,054,887 | | 10/1991 | Kato et al. | 350/339 |
|---|---|---|---|---|
| 5,339,181 | * | 8/1994 | Kim et al. | 359/59 |
| 5,349,205 | | 9/1994 | Kobayashi et al. | 257/59 |
| 5,352,907 | | 10/1994 | Matsuda et al. | 257/59 |
| 5,359,206 | * | 10/1994 | Yamamoto et al. | 257/59 |
| 5,367,179 | | 11/1994 | Mori et al. | 257/59 |
| 5,530,568 | * | 6/1996 | Yamamoto et al. | 359/54 |
| 5,589,962 | * | 12/1996 | Yamamoto et al. | 349/46 |
| 5,731,216 | * | 3/1998 | Holmber et al. | 437/40 |
| 5,731,856 | * | 3/1998 | Kim et al. | 349/43 |
| 5,781,255 | * | 7/1998 | Yamamoto et al. | 349/46 |

FOREIGN PATENT DOCUMENTS 2-245736   10/1990   (JP) .

* cited by examiner

Primary Examiner—William L. Sikes
Assistant Examiner—Julie Ngo
(74) Attorney, Agent, or Firm—Antonelli, Terry, Stout & Kraus, LLP

(57) ABSTRACT

An anodized oxide film of Al is formed on a scanning signal line and a gate electrode. Al—Ta is used as material of each of the scanning signal line and gate electrode. The thickness of the anodized oxide film is set to at least 1,000 angstroms. The fabrication yield and reliability can be improved.

33 Claims, 17 Drawing Sheets

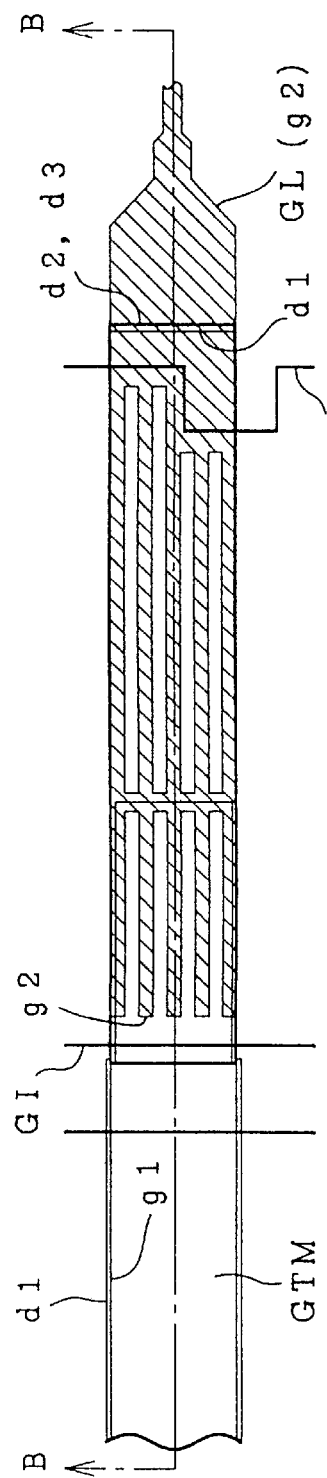
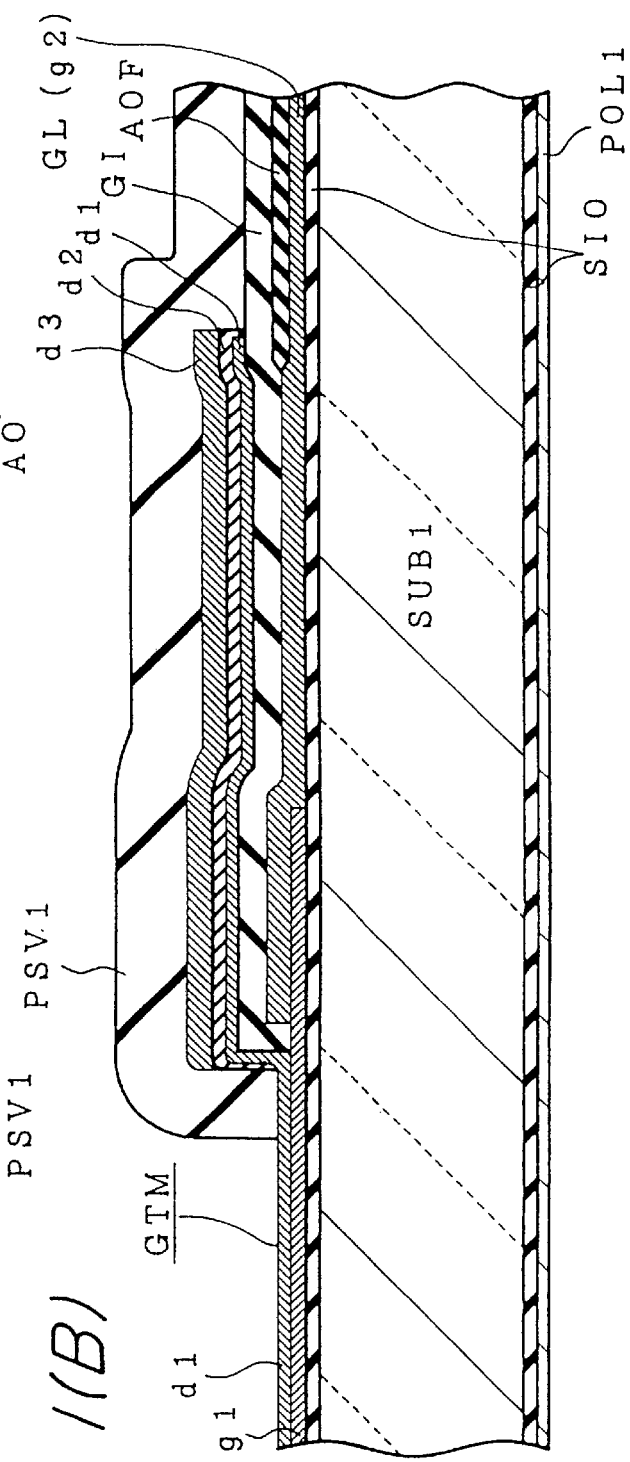
FIG. 1(A)
FIG. 1(B)

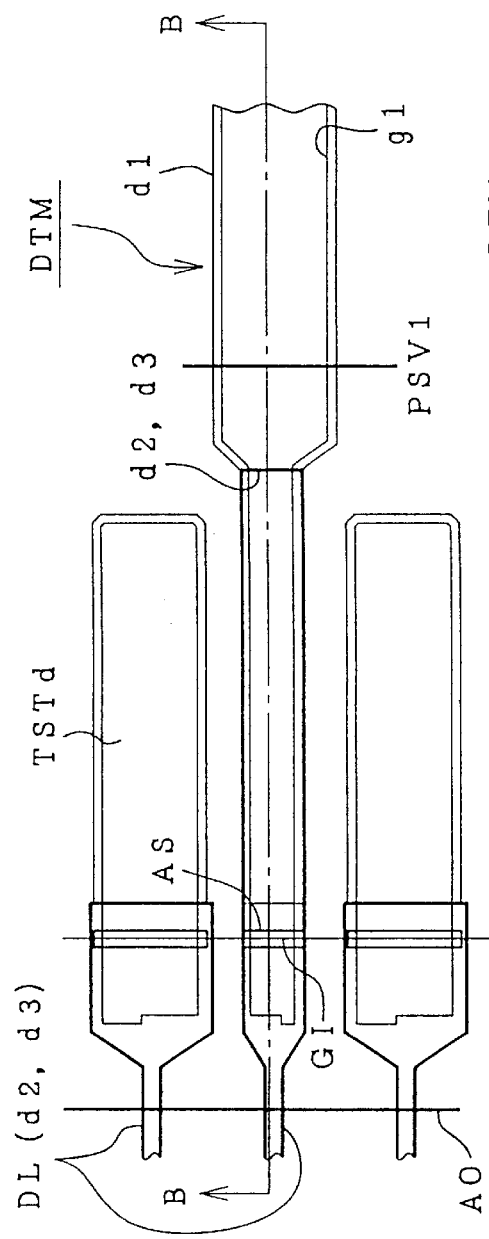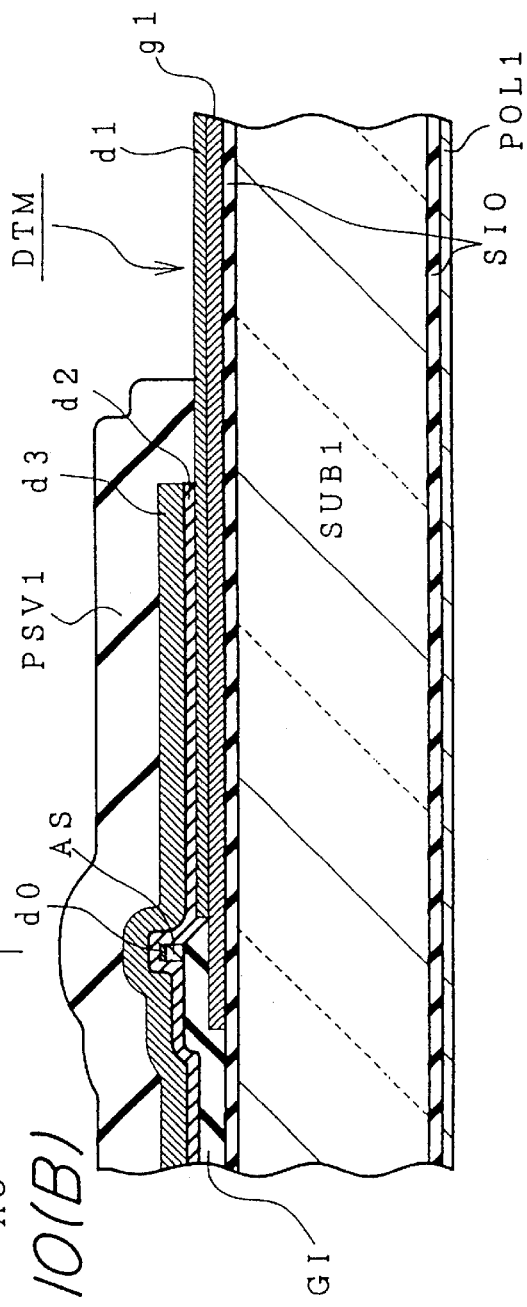
FIG. 10(A)
FIG. 10(B)

ACTIVE MATRIX DISPLAY DEVICE USING ALUMINUM ALLOY IN SCANNING SIGNAL LINE OR VIDEO SIGNAL LINE

CROSS-REFERENCE TO RELATED APPLICATIONS

This application is a continuation of application Ser. No. 08/725,256, filed on Oct. 4, 1996 now U.S. Pat. No. 5,781, 255; which is a continuation of application Ser. No. 08/467, 967, filed Jun. 6, 1995 now U.S. Pat. No. 5,589,962; which is a continuation of application Ser. No. 08/072,966, filed Jun. 8, 1993 now abandoned, the entire disclosures of which are hereby incorporated by reference.

BACKGROUND OF THE INVENTION

1. Field of the Invention

The present invention relates to a thin film transistor substrate, especially, a thin film transistor substrate of, for example a liquid crystal display device of active matrix type using thin film transistors, a liquid crystal display panel and a liquid crystal display device.

2. Description of Related Art

In a liquid crystal display device of active matrix type, non-linear elements (e.g., switching elements) are disposed in a manner to correspond to a plurality of pixel electrodes arranged in matrix, respectively. The liquid crystal in each pixel is always driven, in principle, (at a duty ratio of 1.0). Therefore, in comparison with the so-called "simple matrix type" which employs a time division driving system, the active system has better contrast and has become an indispensable technique particularly in a color liquid crystal display device. A typical example of the switching element is a thin film transistor (TFT).

In a conventional thin film transistor substrate of a liquid crystal display device of active matrix type, pure Al, Al—Pd or Al—Si is used as a material of a scanning signal line and a gate electrode, and an anodized oxide layer of Al is formed on the scanning signal line and gate electrode.

Here, the liquid crystal display device of active matrix type using the thin film transistors is known in JP-A-2-85826 or on pp. 193 to 210 of Nikkei Electronics entitled "Active Matrix Type Color Liquid Crystal Display of 12.5 Type Adopting Redundant Construction" and issued on Dec. 15, 1986 by NIKKEI McGRAW-HILL, for example.

Available as prior arts are U.S. Pat. No. 5,132,820 (Someya et al), U.S. Pat. No. 4,786,148 (Sekimura et al) and JP-A-62-269120. None of them, however, give a description "a scanning signal line and a gate electrode are made of an alloy of Al and an insulating film formed of an anodized oxide film of the scanning signal line or the gate electrode is formed on the surface of at least one of the scanning signal line and the gate electrode".

U.S. Pat. No. 5,028,122 (Hamada et al) and JP-A-2-106723 (Nagase) resemble the present invention in point of a description "a gate electrode is made of Ta and an insulating film formed of an anodized oxide film of the gate electrode is formed on the surface of the gate electrode" but fail to give a description "an alloy of Al and Ta is used in a gate electrode to provide a higher insulating property of the anodized oxide film than that obtained when Ta is used". In the present invention one of the features is represented in the description that "a scanning signal line and a gate electrode are made of an Al and Ta alloy and an anodized oxide film of the scanning signal line or the gate electrode is formed on the surface of at least one of the scanning signal line and the gate electrode" to thereby obtain a higher anodized oxide film insulating characteristic than that obtained with Ta, as shown in FIG. 17.

In a thin film transistor substrate using pure Al as a material of a scanning signal line and a gate electrode, a hillock takes place; in a thin film transistor substrate using Al—Pd as a material of a scanning signal line and a gate electrode, a hillock takes place and besides an anodized oxide film has a low breakdown voltage; and in a thin film transistor substrate using Al—Si as a material of a scanning signal line and a gate electrode, a residue is generated after etching. Accordingly, in any of the above thin film transistor substrates, the fabrication yield and reliability are degraded and the production process becomes complicated for the purpose of improving the fabrication yield, thus raising the cost of production.

SUMMARY OF THE INVENTION

The present invention is achieved to solve the aforementioned problems and it is an object of this invention to provide high-fabrication yield and highly reliable thin film transistor substrate, liquid crystal display panel and liquid crystal display device.

To accomplish the above object, according to the present invention, in a thin film transistor substrate in which an anodized oxide film of Al is formed on at least one of a scanning signal line and a gate electrode, Al—Ta or Al—Ti is used as a material of the scanning signal line and the gate electrode. The breakdown voltage of the anodized oxide film is important. As a result of experiments conducted in connection with the breakdown voltage, the present inventor had a knowledge of the fact that when a material which cannot be anodized (for example, Pd or Si) is used as a material to be added to Al, a resulting oxide film has a low breakdown voltage but when a material which can be anodized (for example, Ta or Ti) is added, a resulting oxide film has a remarkably high breakdown voltage. The thickness of the anodized oxide film is set to 1,000 angstroms or more.

In this case, a material containing Cr is used for a gate terminal connected to the scanning signal line.

Al—Ta or Al—Ti is used as a material of the gate terminal connected to the scanning signal line, the side of the gate terminal is covered with an insulating film and the top of the gate terminal is covered with another conductive film.

The additive amount of Ta or Ti in the Al—Ta or Al—Ti is 0.5 to 2.5 at % (atomic percentage; a ratio of the number of added atoms to the number of total atoms in a certain volume).

A different insulating film is formed on the anodized oxide film formed on the gate electrode.

In this case, a silicon nitride film is used as the different insulating film.

Al—Ta or Al—Ti is used as a material of the video signal line.

Amorphous silicon hydride is used as a material of an active layer of the thin film transistor.

The anodized oxide film, a different insulating film and an amorphous silicon hydride film are formed between the scanning signal line and the video signal line.

The anodized oxide film and different insulating film are used as a dielectric film of a latching capacitor.

The anodized oxide film is used as the dielectric film of the latching capacitor.

In a liquid crystal display panel having a thin film transistor substrate in which an anodized oxide film of Al is formed on at least one of a scanning signal line and a gate electrode, Al—Ta or Al—Ti is used as a material of the scanning signal line and gate electrode and the thickness of the anodized oxide film is set to 1,000 angstroms or more.

There are provided a liquid crystal display panel having a thin film transistor substrate in which an anodized oxide film of Al is formed on at least one of a scanning signal line and a gate electrode, Al—Ta or Al—Ti is used as a material of the scanning signal line and gate electrode and the thickness of the anodized oxide film is set to 1,000 angstroms or more, a video signal driving circuit for applying a video signal to the liquid crystal display panel, a scanning circuit for applying a scanning signal to the liquid crystal display panel, and a control circuit for applying information for the liquid crystal display panel to the video signal driving circuit and the scanning circuit.

In the thin film transistor substrate, liquid crystal display panel and liquid crystal display device, no hillock takes place, no residue is generated after etching, the anodized oxide film has a high breakdown voltage, and the production process does not become complicated for the sake of improving the fabrication yield.

BRIEF DESCRIPTION OF THE DRAWINGS

FIGS. 1(A) and 1(B) present a plan view and a cross section showing the vicinity of a connecting portion between a gate terminal GTM and a scanning signal line GL;

FIGS. 10(A) and 10(B) present a plan view and a cross section showing the vicinity of a connecting portion between a drain terminal DTM and a video signal line DL;

Figure 2:
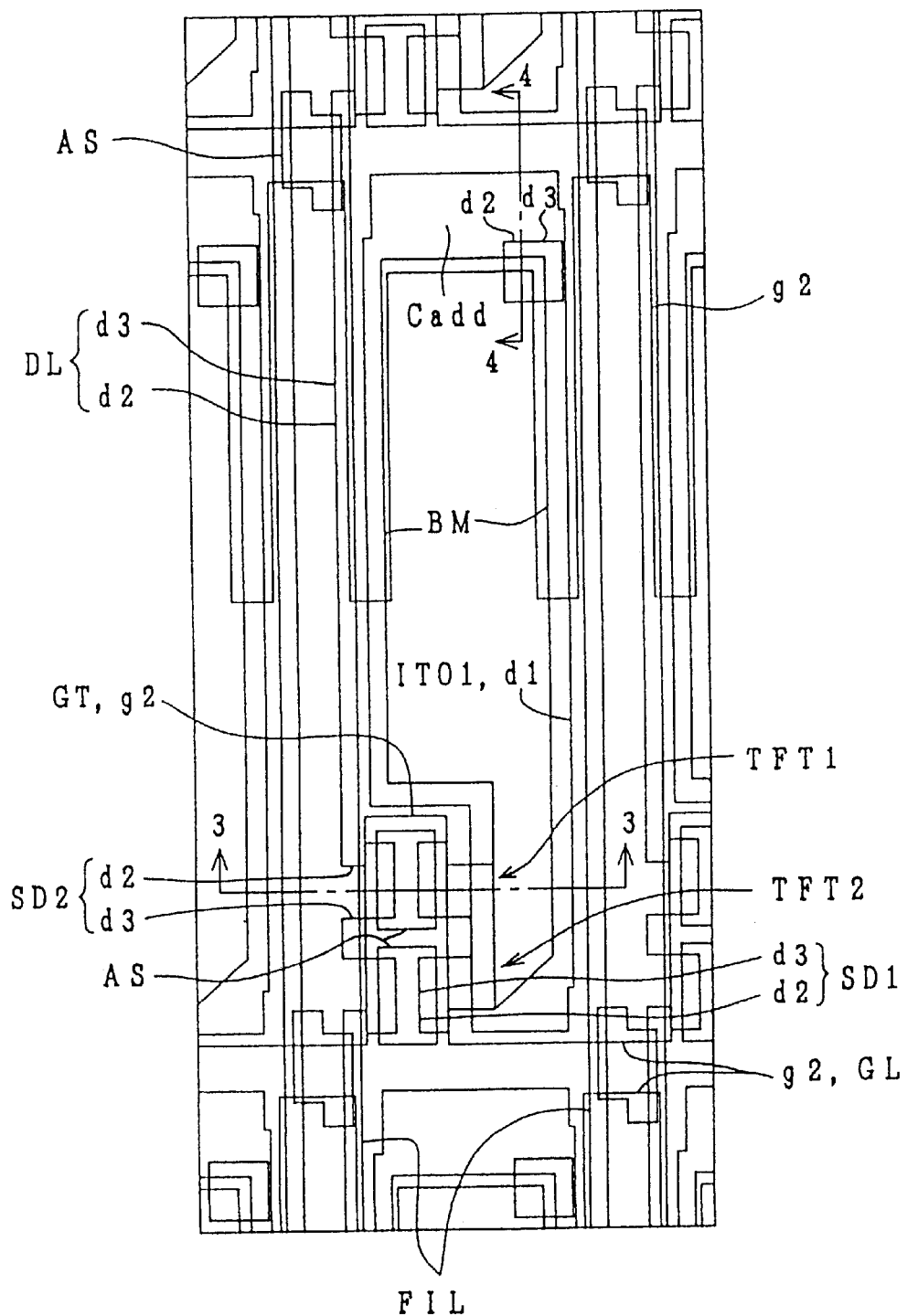
FIG. 2 is a plan view showing an essential portion of one pixel of a liquid crystal display of a color liquid crystal display device of active matrix type, to which is applied the present invention, and the neighborhood of the one pixel.

DESCRIPTION OF THE PREFERRED EMBODIMENTS (Active Matrix Liquid Crystal Display Device)

Here will be described, in the following embodiments in which the present invention is applied to a color liquid crystal display device of active matrix type. Incidentally, the parts having identical functions are designed by identical reference numerals throughout all the Figures to be referred to hereinafter and their repeated descriptions will be omitted.

Figure 3:
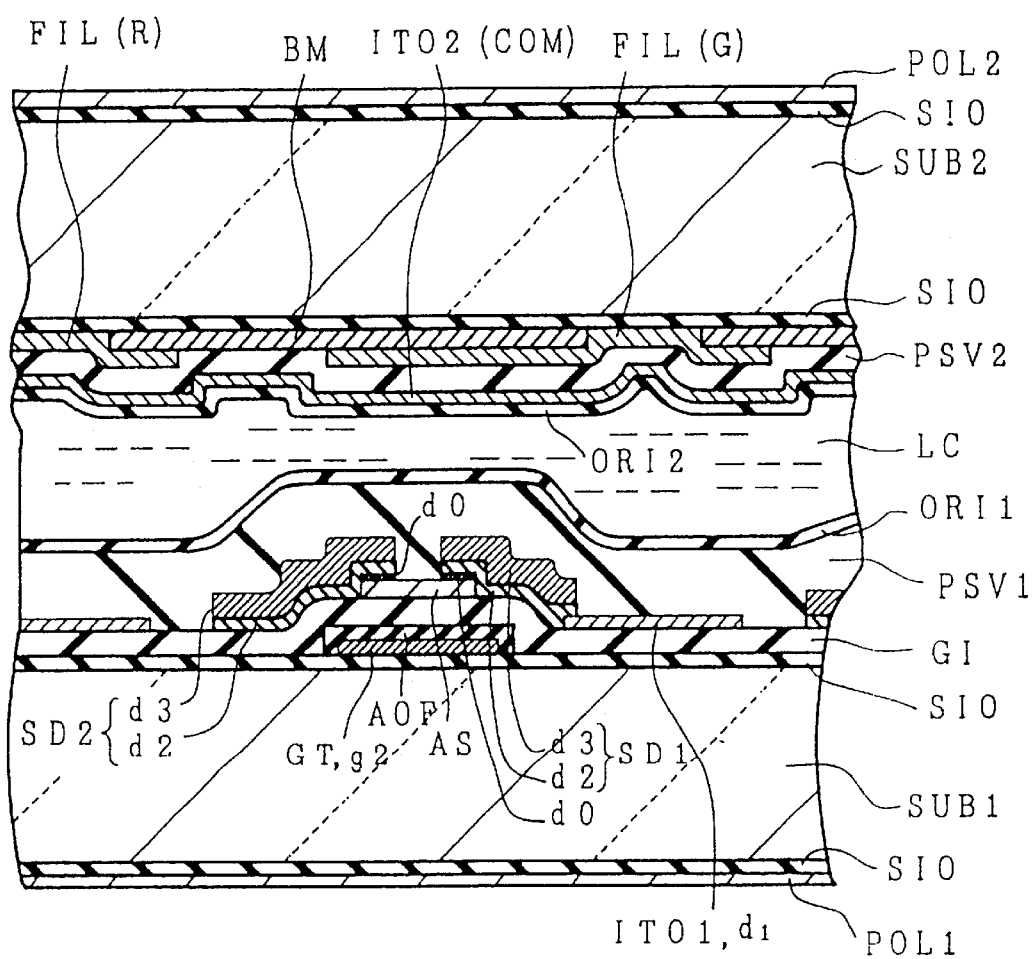
FIG. 3 is a cross section taken along the line 3—3 of FIG. 2 and shows one pixel and its peripheral portion.
Figure 4:
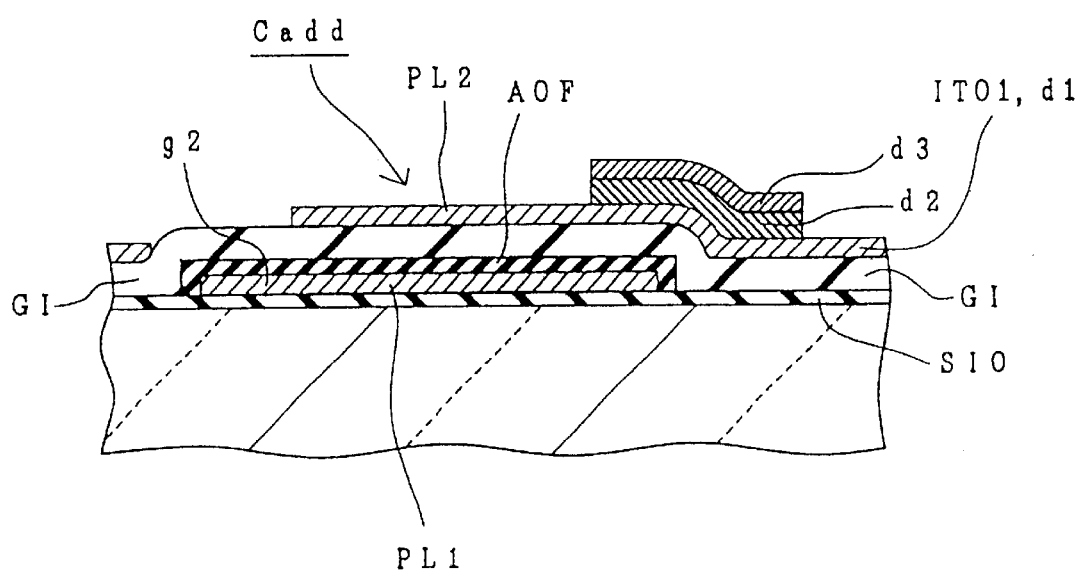
FIG. 4 is a cross section taken along the line 4—4 of FIG. 2 and shows a latching capacitor Cadd.
Figure 5:
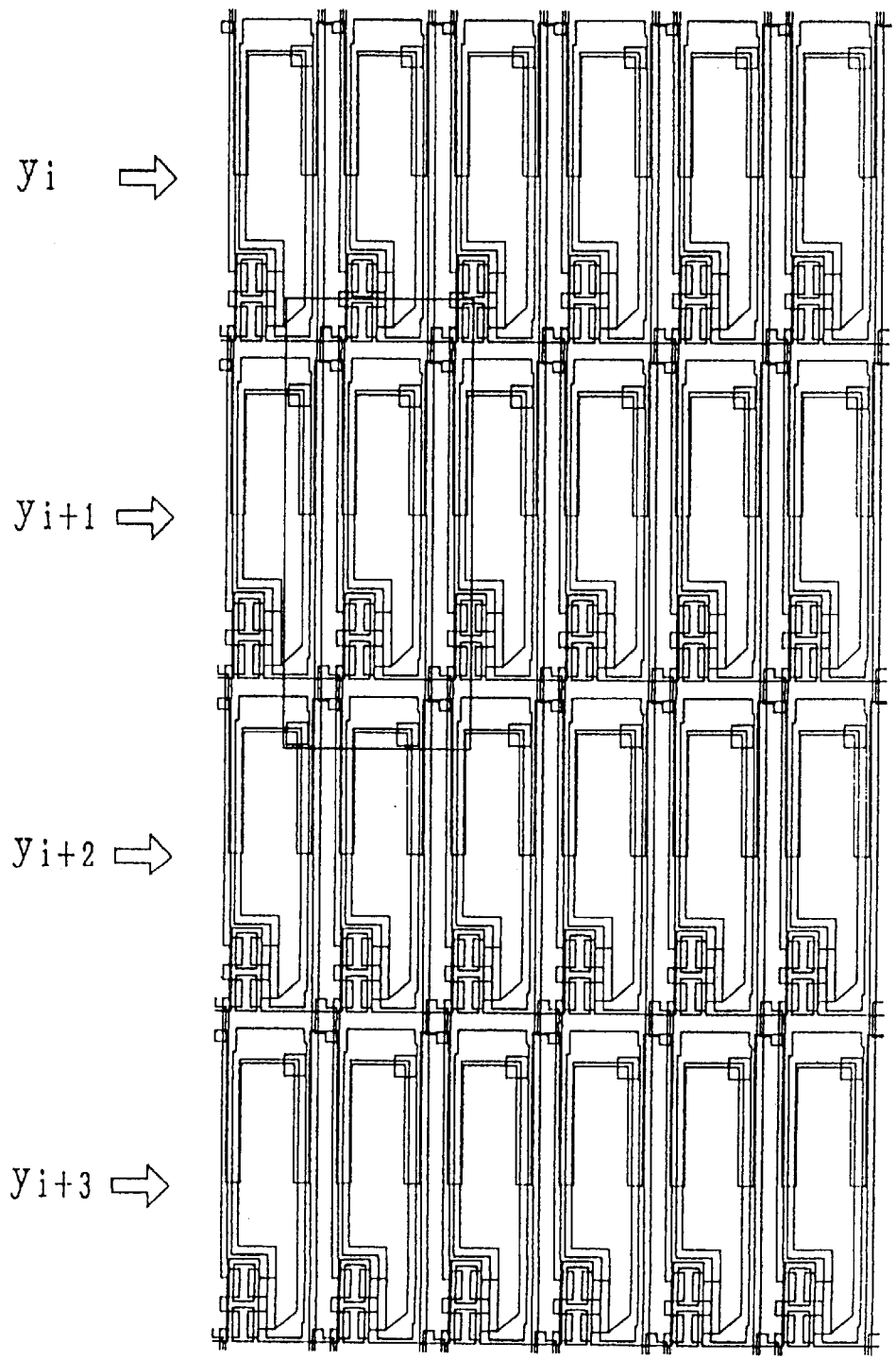
FIG. 5 is a plan view showing an essential portion of a liquid crystal display in which a plurality of pixels, one being shown in FIG. 2, are arranged.

FIG. 2 is a plan view showing one pixel and its peripheral portion of the active matrix type color liquid crystal display device to which is applied the present invention. FIG. 3 is a section taken along the line 3—3 of FIG. 2. FIG. 4 is a section taken along the line 4—4 of FIG. 2. On the other hand, FIG. 5 is a plan view showing the case in which a plurality of pixels, one being shown in FIG. 2, are arranged.

(Pixel Disposition)

As shown in FIG. 2, each pixel is disposed in a region (surrounded by four signal lines) defined by two adjacent scanning signal lines (e.g., gate signal lines or horizontal signal lines) GL which cross two adjacent video signal lines (e.g., drain signal lines or vertical signal lines) DL. Each pixel includes a thin film transistor TFTR a transparent pixel electrode ITO1 and a latching capacitor Cadd. The scanning signal lines GL are extended in the column direction and arranged in plurality in the row direction. The video signal lines DL are extended in the row direction and arranged in plurality in the column direction.

(Overall Sectional Structure of Display Unit)

As shown in FIG. 3, relative to a liquid crystal layer LC, the thin film transistor TFT and the transparent pixel electrode ITO1 are formed on the side of a lower transparent glass substrate SUB1 and a color filter FIL and a black matrix pattern BM for light shielding are formed on the side of an upper transparent glass substrate SUB2. The lower transparent glass substrate SUB1 is made to have a thickness of about 1.1 mm, for example. On the both surfaces of each of the transparent glass substrates SUB1 and SUB2, there are formed silicon oxide films SIO which are deposited by the dip treatment. Accordingly, even if there exist sharp defects at the surfaces of the transparent glass substrates SUB1 and SUB2, the sharp defects can be covered with the silicon oxide films SIO and therefore, film quality of the scanning signal lines GL and the light shielding film BM to be deposited thereon can be kept to be uniform.

Although not illustrated, a seal pattern made of, for example, epoxy resin is applied along the entire peripheral edge, excepting a liquid crystal filling port, of each of the transparent glass substrates SUB1 and SUB2 so that liquid crystal LC may be sealed. A common transparent pixel electrode ITO2 on the side of upper transparent glass substrate SUB2 is connected at least, at its part, to external outgoing wiring formed on the side of lower transparent glass substrate SUB1, by a silver paste member. The external outgoing wiring is formed through the same fabrication process as that for gate terminal GTM and drain terminal DTM to be described later.

Orientation films ORI1 and ORI2, the transparent pixel electrode ITO1 and the common transparent pixel electrode ITO2 are each formed inside the seal pattern. Polarization plates POL1 and POL2 are formed on the outer surfaces of the lower transparent glass substrate SUB1 and the upper transparent glass substrate SUB2, respectively. The liquid crystal LC is filled in a region between the lower and upper orientation films ORI1 and ORI2 for setting the orientation of the liquid crystal molecules and is sealed by the seal pattern. The lower orientation film ORI1 is formed on a passivation film PSV1 on the side of the lower transparent glass substrate SUB1.

Sequentially laminated on the inner (close to liquid crystal LC) surface of the upper transparent glass substrate SUB2 are the light shielding film BM, color filter FIL, passivation film PSV2, common transparent pixel electrode ITO2 (COM) and upper orientation film ORI2.

This liquid crystal display device is assembled: by superposing the individual layers on the side of the lower transparent glass substrate SUB1 and the individual layers on the side of the upper transparent glass substrate SUB2; by superposing the lower transparent glass substrate SUB1 and the upper transparent glass substrate SUB2; and by injecting the liquid crystal LC into the region between the lower transparent glass substrate SUB1 and upper transparent glass substrate SUB2.

(Thin Film Transistor TFT)

If a positive bias is applied to the gate electrode GT, the thin film transistor TFT has its channel resistance reduced between its source and drain. If the bias is reduced to zero, the thin film transistor TFT operates to have its channel resistance increased.

The thin film transistor TFT of each pixel is divided into two (or plurality) in the pixel, so that it is composed of thin film transistors (or divided thin film transistors) TFT1 and TFT2. These thin film transistors TFT1 and TFT2 are individually made to have a substantially equal size (equal in the channel length and width). Each of these divided thin film transistors TFT1 and TFT2 is composed of a gate electrode GT, a gate insulating film GI, an i-type (i.e., intrinsic type not doped with a conductivity type determining impurity) amorphous silicon (Si) semiconductor layer AS, and a pair of source electrode SD1 and drain electrode SD2. Incidentally, the source and drain are intrinsically determined in dependence upon the bias polarity therebetween, and this polarity is inverted during the operation in the circuit of the present liquid crystal display device. Thus, it should be understood that the source and drain interchange during the operation. In the following description, however, one is fixed as the source whereas the other is fixed as the drain, for convenience only.

(Gate Electrode GT)

Figure 6:
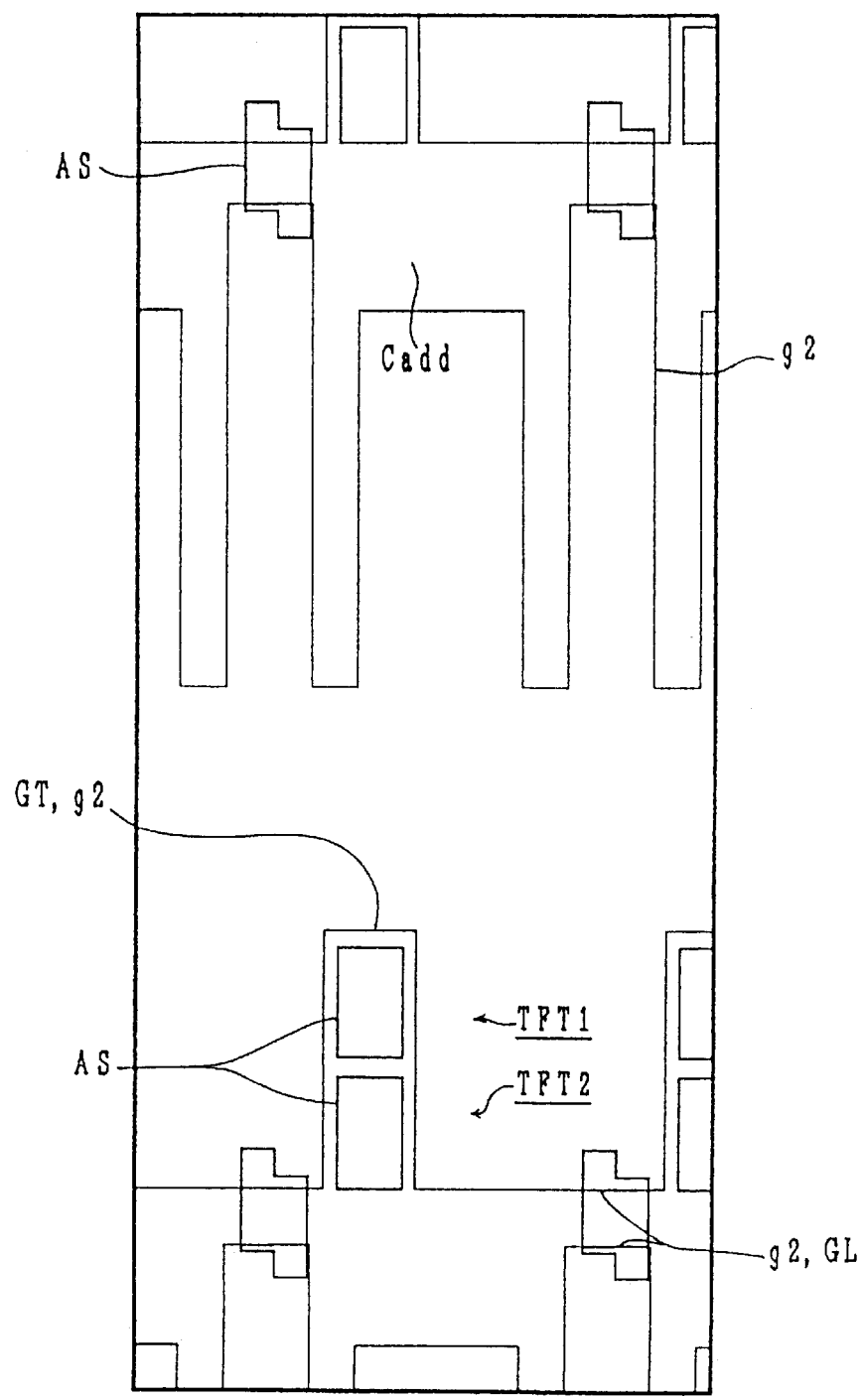
FIG. 6 is a plan view drawing only conductive film g2 and i-type semiconductor layer AS of the pixel shown in FIG. 2.

The gate electrode Gt is formed to project perpendicularly (i.e., upward, as viewed in FIGS. 2 and 6) from the scanning signal lines GL (or branched in the "T-shape"), as shown in detail in FIG. 6 (presenting a plan view showing the second conductive film g2 and i-type semiconductor layer AS of FIG. 2 only). The gate electrode GT goes beyond the active region of each of the thin film transistors TFT1 and TFT2. These thin film transistors TFT1 and TFT2 have their individual gate electrodes GT integrated (as their common gate electrode) to merge into the scanning signal line GL. In this embodiment, the gate electrode GT is constituted by a monolayer of the second conductive film g2.

Used as the second conductive film g2 is an Al—Ta film (the additive amount of Ta being 1.5 at %) formed by, for example, sputtering in a thickness of about 1,000 to 5,500 angstroms. On the gate electrode Gt, there is provided an anodized oxide film AOF of Al and having a thickness of 1,800 angstroms.

Since in this manner the Al—Ta film is used as the second conductive film g2, no hillock is generated, no residue remains after etching and the anodized oxide film AOF has a high breakdown voltage, the fabrication yield can be improved by 5%, thus promoting reliability. In addition, since the fabrication yield can be improved without making the production process complicated, the cost of production can be low.

Figure 16:
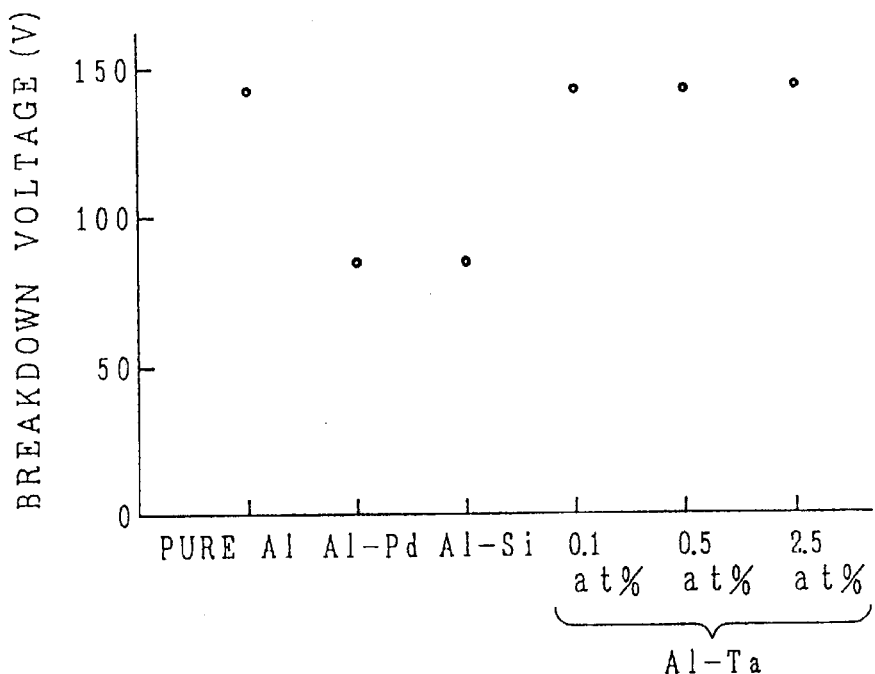
FIG. 16 is a graph showing breakdown voltage characteristics of anodized oxide films.
Figure 17:
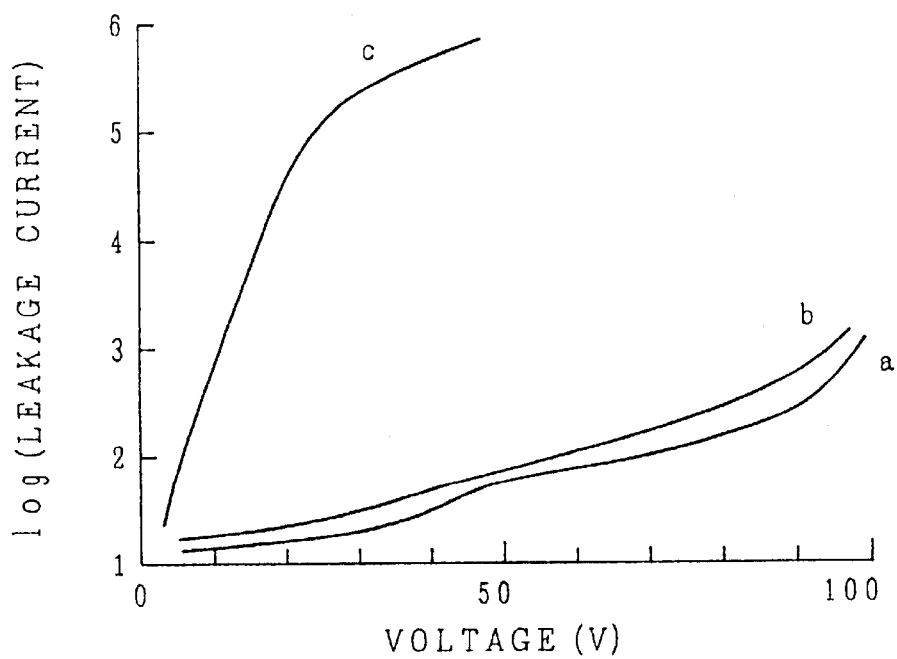
FIG. 17 is a graph showing insulating characteristics of the anodized oxide films.

When the additive amount of Ta in the Al—Ta film exceeds 0.5 at %, any hillock and whisker are not generated at a temperature of about 300° C., exhibiting excellent thermal stability. When the additive amount of Ta in the Al—Ta film is below 2.5 at %, the second conductive film g2 can be removed perfectly by etching, leaving behind no residue. FIG. 16 is a graph showing breakdown voltages of anodized oxide films made of different materials (2,000-angstrom thick). As is clear from FIG. 16, when the materials are Al—Pd and Al—Si, the anodized oxide films have a breakdown voltage of about 80V, whereas when the material is Al—Ta, the anodized oxide film has a breakdown voltage of about 140V equal to that of pure Al. FIG. 17 is a graph showing insulation characteristics of the anodized oxide films, with curve a representing the case of the pure Al anodized oxide film, curve b representing the case of the Al—Ta anodized oxide film (the additive amount of Ta being 2.5 at %) and curve c representing the case of the Ta anodized oxide film. As will be seen from FIG. 17, the insulation characteristic of the Al—Ta anodized oxide film is as excellent as that of the pure Al anodized oxide film. As the additive amount of Ta in Al—Ta, the resistivity of the second conductive film g2 increases. But since the resistivity of a material of the scanning signal line GL is designed to be limited to twice the resistivity of pure Al and the resistivity of a material of the video signal line DL is designed to be limited to five times the resistivity of pure Al, the additive amount of Ta is desired to be 2.5 at % or less.

Then, for prevention of breakdown, the anodized oxide film AOF is designed to have a thickness of 1,000 angstroms or more.

This gate electrode GT is made to be larger than the i-type semiconductor layer AS so as to cover it completely (as viewed from below), as shown in FIGS. 2 and 3 and FIG. 6. Therefore, in case back lights such as fluorescent lamps are attached to the bottom of the lower transparent glass substrate SUB1, this opaque Al gate electrode GT establishes a shadow to shield the i-type semiconductor layer AS from back light, thus substantially eliminating the conducting phenomenon due to the optical irradiation, i.e., the deterioration of the OFF characteristics of the thin film transistor TFT. Here, the intrinsic size of the gate electrode GT is so determined as to have a width which can bridge, at the least, the source electrode SD1 and drain electrode SD2 (including the positioning tolerance between the gate electrode GT and each of the source electrode SD1 and drain electrode SD2) and have a depth for determining channel width W which is determined in dependence upon a factor W/L determining a mutual conductance gm, i.e., the ratio of the depth to the distance (i.e., the channel length) L between the source and drain electrodes SD1 and SD2. The size of the gate electrode GT in the liquid crystal display device is naturally made to be larger than the aforementioned intrinsic size.

(Scanning Signal Line GL)

The scanning signal line GL is constituted by the second conductive film g2. The second conductive film g2 of the scanning signal line GL is formed through the same fabrication process as that for the second conductive film g2 of the gate electrode GT and the former film g2 is integral with the latter film g2. Moreover, the scanning signal line GL is also formed thereon with the anodized oxide film AOF of Al.

(Insulating Film GI)

The insulating film GI is used as the gate insulating film of each of the thin film transistors TFT1 and TFT2. The insulating film GI is formed on the gate electrode GT and scanning signal line GL. The insulating film GI is formed of, for example, a silicon nitride film prepared by the plasma CVD, to have a thickness of 1,200 to 2,700 angstroms (e.g., about 2,000 angstroms in the present liquid crystal display device).

(i-Type Semiconductor Layer AS)

The i-type semiconductor layer AS is used as the channel forming region of each of the divided plural thin film transistors TFT1 and TFT2, as shown in FIG. 6. The i-type semiconductor layer As is formed of an amorphous silicon hydride film or polycrystalline silicon film to have a thickness of about 200 to 2,200 angstroms (e.g., about 2,000 angstroms in the present liquid crystal display device).

This i-type semiconductor layer AS is formed successively to the formation of an insulating film GI of $Si_3N_4$ used as the gate insulating film by changing components of supply gas through the use of a common plasma CVD system, without being exposed to the outside of the plasma CVD system. On the other hand, an N(+)-type semiconductor layer d0 (shown in FIG. 3) doped with phosphor (P) by 2.5% and used for ohmic contact is likewise formed successively to have a thickness of about 200 to 500 angstroms (e.g., about 300 angstroms in the present liquid crystal display device). After this, the lower transparent glass substrate SUB1 is taken out of the CVD system, and the N(+)-type semiconductor layer d0 and the i-type semiconductor layer AS are patterned into independent islands by the photographic technology, as shown in FIGS. 2 and 3 and FIG. 6.

The i-type semiconductor layer As is also interposed at an intersecting portion (or crossover portion) between the scanning signal line GL and the video signal line DL, as shown in FIGS. 2 and 6. This i-type semiconductor layer As at the intersecting portion is effective to reduce the short-circuiting between the scanning signal line GL and the video signal line DL at the intersecting portion.

(Transparent Pixel Electrode ITO1)

The transparent pixel electrode ITO1 constitutes one of sets of the pixel electrodes of a liquid crystal display.

The transparent pixel electrode ITO1 is connected with both the source electrode SD1 of the thin film transistor TFT1 and the source electrode SD1 of the thin film transistor TFT2. Even if, therefore, one of the thin film transistors TFT1 and TFT2 becomes defective, a suitable portion may be cut by a laser beam in case the defect invites an adverse action; or otherwise the situation may be left as it is because the other thin film transistor is normally operating. Incidentally, both the two thin film transistors TFT1 and TFT2 scarcely become defective concurrently, and the probability of the point defect or line defect can be drastically reduced by that redundant system. The transparent pixel electrode ITO1 is formed of a first conductive film d1, which is made of a transparent conductive film (of Indium-tin-Oxide, i.e., ITO or NESA film) to have a thickness of 1,000 to 2,000 angstroms (e.g., about 1,400 angstroms in the present liquid crystal display device).

(Source Electrode SD1 and Drain Electrode SD2)

Figure 7:
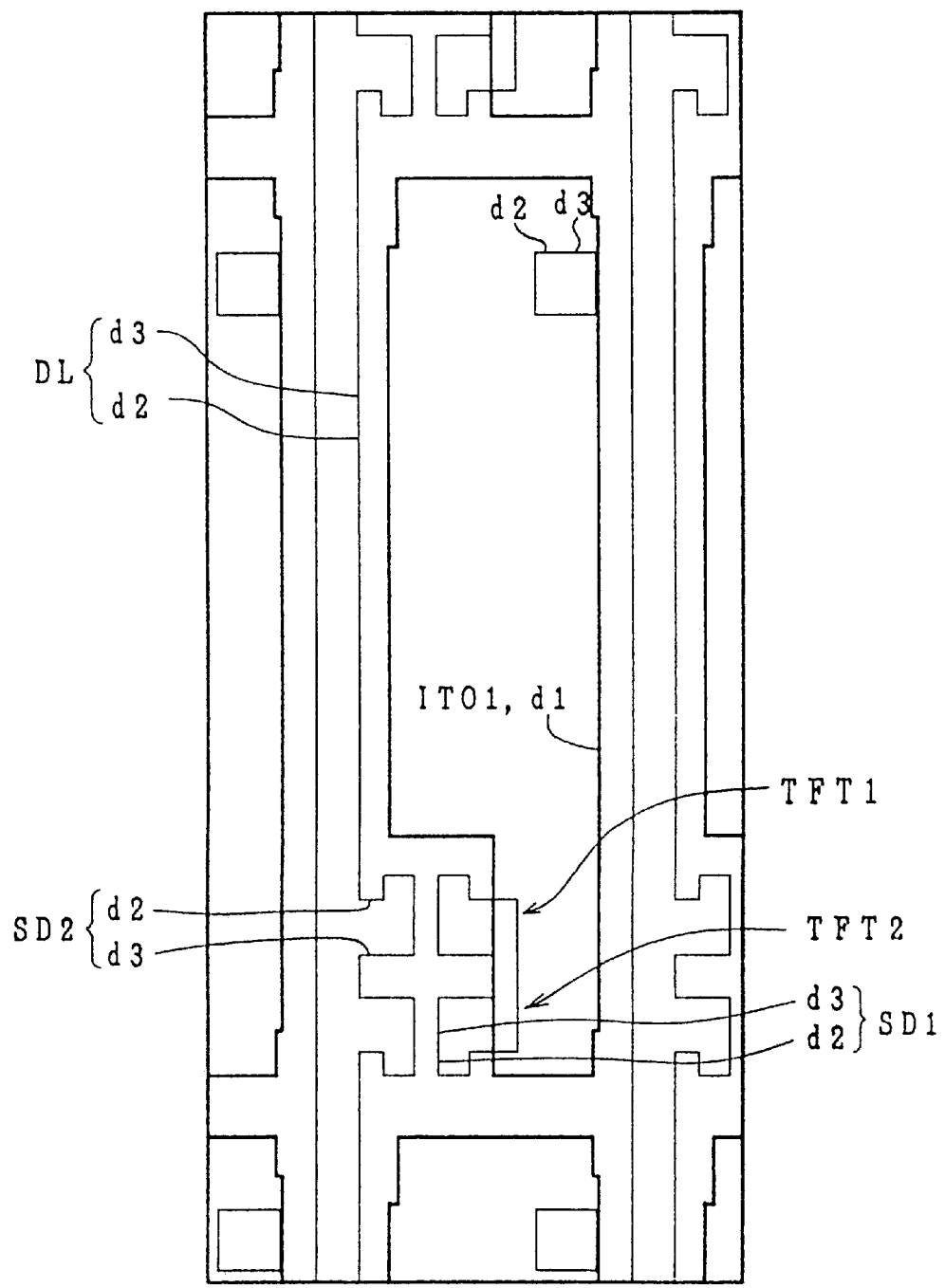
FIG. 7 is a plan view drawing only conductive films d1, d2 and d3 of the pixel shown in FIG. 2.

The source electrode SD1 and drain electrode SD2 of each of the divided plural thin film transistors TFT1 and TFT2 are formed on the i-type semiconductor layer AS and separately from each other, as shown in FIGS. 2 and 3 and FIG. 7 (presenting a plan view showing the first to third conductive films d1 to d3 of FIG. 2 only).

Each of the source electrode SD1 and the drain electrode SD2 is formed by overlaying a second conductive film d2 and a third conductive film d3 sequentially from the lower side contacting the N(+)-type semiconductor layer d0. These second conductive film d2 and third conductive film d3 of the source electrode SD1 are formed through the same fabrication process as that for the second and third conductive films d2 and d3 of the drain electrode SD2.

The second conductive film d2 is formed of a sputtered chromium (Cr) film to have a thickness of 500 to 1,000 angstroms (e.g., about 600 angstroms in the present liquid crystal display device). The Cr film is formed to have a thickness not exceeding about 2,000 angstroms because it suffers high stress if made excessively thick. The Cr film comes in good contact with the N(+)-type semiconductor layer d0. The Cr film constitutes a so-called "barrier layer" for preventing the Al of the third conductive film d3 described hereinafter from diffusing into the N(+)-type semiconductor layer d0. The second conductive film d2 may be made of not only the aforementioned Cr film but also a refractory metal (e.g., Mo, Ti, Ta or W) film or its silicide (e.g., $MoSi_2$, $TiSi_2$, $TaSi_2$ or $WSi_2$).

The third conductive film d3 is formed by sputtering Al—Ta (additive amount of Ta being 2 atomic %) to have a thickness of about 3,000 to 5,000 angstroms (e.g., about 4,000 angstroms in the present liquid crystal display device). The Al—Ta film is less stressed than the Cr layer so that it can be formed to have a larger thickness thereby to reduce the resistances of the source electrode SD1, the drain electrode SD2 and the video signal line DL.

After the second conductive film d2 and the third conductive film d3 have been patterned with the same mask pattern, the N(+)-type semiconductor layer d0 is removed by using the same photographic mask or by using the second conductive film d2 and the third conductive film d3 as a mask. Specifically, the N(+)-type semiconductor layer do left on the i-type semiconductor layer AS is removed excepting a portion which is in self-alignment with the second conductive film d2 and the third conductive film d3. Since, during this removal, the N(+)-type semiconductor layer d0 is etched to lose its whole thickness, the i-type semiconductor layer AS is also etched off slightly at its surface portion, but this removal may be controlled by controlling the etching time.

The source electrode SD1 is connected with the transparent pixel electrode ITO1. The source electrode SD1 is formed along a stepped shape (i.e., a step corresponding to the sum of the thicknesses of the second conductive film g2, the anodized oxide film AOF, the i-type semiconductor layer AS and the N(+)-type semiconductor layer d0) of the i-type semiconductor layer AS. More specifically, the source electrode SD1 is composed of the second conductive film d2 formed along the stepped shape of the i-type semiconductor laye AS and the third conductive film d3 formed on the second conductive film d2. This third conductive film d3 of the source electrode SD1 is formed to climb over the i-type semiconductor AS, because the Cr film of the second conductive film d3 cannot be made to be so thick, because of an increase in stress, as to climb over the stepped shape of the i-type semiconductor laye AS. In short, the third conductive film d3 is made to be thick to improve the step coverage. The third conductive film d3 can be made to be thick so that it can highly contribute to the reduction of the resistance of the source electrode SD1 (this holds true for the drain electrode SD2 and the video signal line DL).

(Passivation Film PSV1)

On the thin film transistor TFT and the transparent pixel electrode ITO1, there is formed a passivation film PSV1, which is provided mainly for protecting the thin film transistor TFT against humidity or the like. Thus, the passivation film PSV1 to be used is highly transparent and humidity resistant. The passivation film PSV1 is formed of a silicon oxide film or silicon nitride film prepared by, for example, the plasma CVD system, to have a thickness of about 1 micron.

(Light Shielding Film BM)

Figure 8:
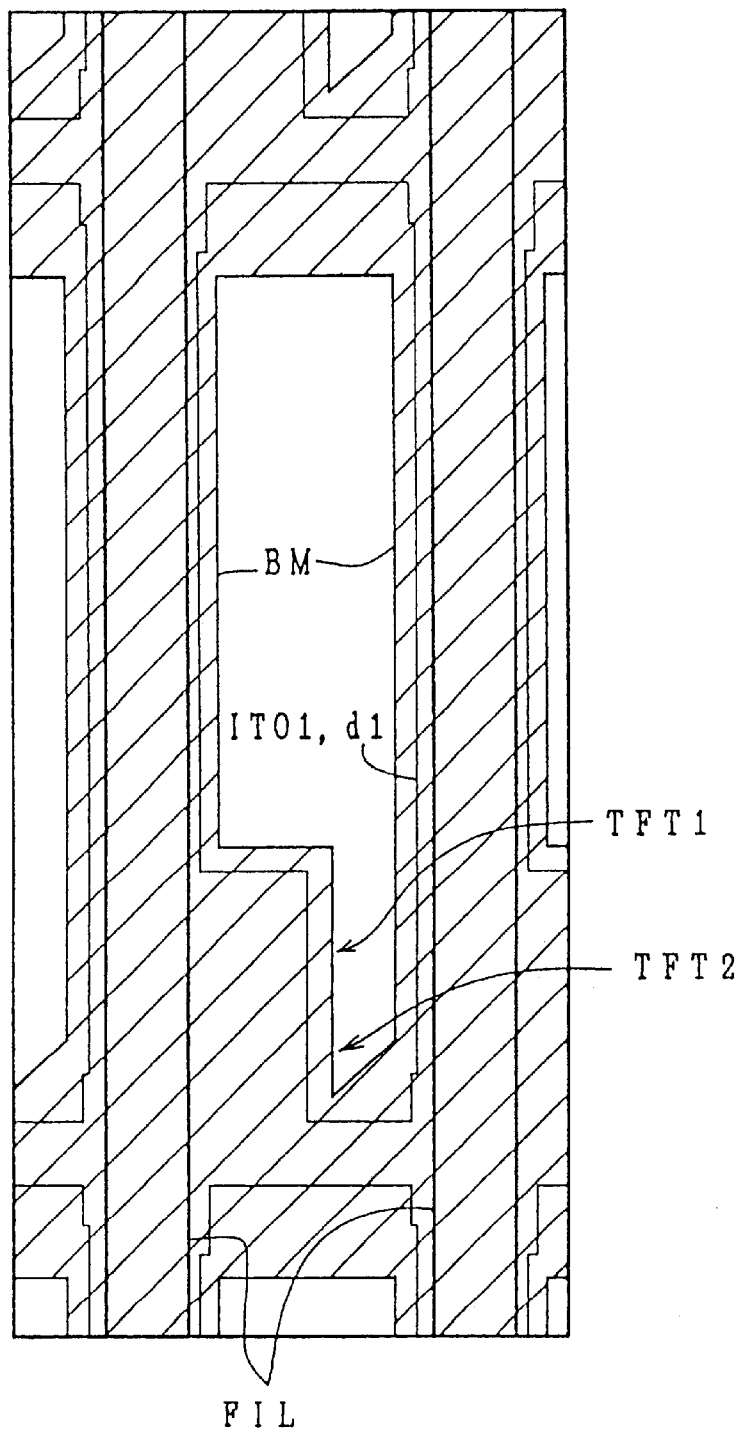
FIG. 8 is a plan view drawing only a pixel electrode layer, a light-shielding film and a color filter layer of the pixel shown in FIG. 2.

On the side of the upper transparent glass substrate SUB2, there is disposed the light shielding film BM for shielding any external light (i.e., light coming from above in FIG. 3) from entering the i-type semiconductor layer AS to be used as the channel forming region, having a patterns as hatched in FIG. 8. Here, FIG. 8 is a plan view showing only the first conductive film d1 comprised of the ITO film, the color filter FIL and the light shielding film BM of FIG. 2. The light shielding film BM is formed of a film having a high shielding property against light, e.g., an aluminum film or chromium film. In the present liquid crystal display device, used as the light shielding film BM is a chromium film formed by sputtering to have a thickness of about 1,300 angstroms.

As a result, the common i-type semiconductor layer AS shared by the thin film transistors TFT1 and TFT2 is sandwiched between the upper light shielding film BM and the lower, larger gate electrode GT, so that it can be shielded from external natural light and back light. The light shielding film BM is formed around the pixel, as hatched in FIG. 8. Specifically, the light shielding film BM is formed in a lattice (of black matrix) shape, which defines the effective display region of one pixel. As a result, the contour of each pixel is clarified by the light shielding film BM to improve the contrast. In other words, this light shielding film BM has two functions, i.e., the function of shielding the i-type semiconductor layer AS from light and the black matrix function.

Further, since a portion (a right below portion of FIG. 2) opposing an edge at the foot of the transparent pixel electrode ITO1 in the rubbing direction is shielded from light by the light shielding film BM, even if a domain is induced at that portion, the display characteristics are hardly deteriorated because the domain is shaded.

Incidentally, the back lights may be attached on the side of the upper transparent glass substrate SUB2, whereas the lower transparent glass substrate SUB1 may be used as the observation side (externally exposed side).

(Color Filter FIL)

Figure 9:
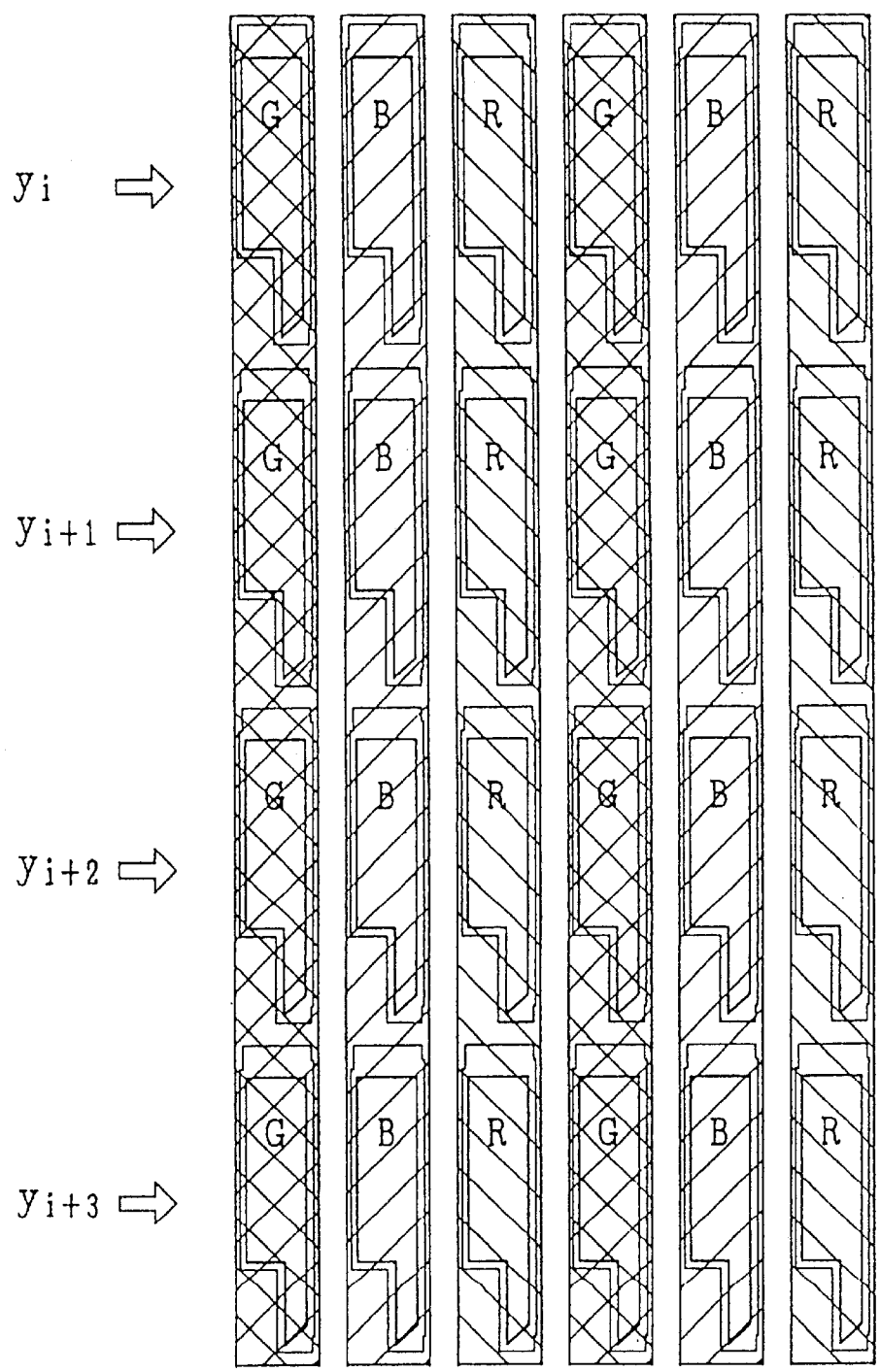
FIG. 9 is a plan view showing an essential portion of only the pixel electrode layer, the light-shielding film and the color filter layer of the pixel arrangement shown in FIG. 5.

The color filter FIL is prepared by coloring a dyeing base, which is made of a resin material such as acrylic resin, with a dye. The color filter FIL are formed each in the shape of a stripe at a position opposing a pixel (FIG. 9) and are dyed differently (FIG. 9 shows the first conductive film d1, the light shielding film BM and the color filter FIL of FIG. 5 only, and the B, G and R color filters FIL are hatched at 45 degrees, at 135 degrees and in a crossing manner, respectively). The color filter FIL is made to be slightly larger to cover the whole of the transparent pixel electrode ITO1, as shown in FIGS. 8 and 9. The light shielding film BM is so formed inside the peripheral edge of the transparent pixel electrode ITO1 as to overlap edges of the color filter FIL and the transparent pixel electrode ITO1.

The color filter FIL can be formed in the following manner. First of all, the dyeing base is formed on the surface of the upper transparent glass substrate SUB2, and the dyeing base is partly removed to leave behind its region for formation of red color filter by the photolithographic technology. After this, the dyeing base is dyed with red dye and fixed to form the red filter R. Next, the green filter G and the blue filter B are sequentially formed through similar steps.

(Passivation Film PSV2)

The passivation film PSV2 is provided for preventing the dyes used for differently dyeing the color filters FIL from leaking into the liquid crystal LC. The passivation film PSV2 is made of a transparent resin material such as acrylic resin or epoxy resin.

(Common Transparent Pixel Electrode ITO2)

The common transparent pixel electrode ITO2 opposes the transparent pixel electrode ITO1, which is provided for each pixel on the side of the lower transparent glass substrate SUB1, so that the optical state of liquid crystal lc changes in response to the potential difference (or electric field) between each pixel electrode ITO1 and the common transparent pixel electrode ITO2. This common transparent pixel electrode ITO2 is fed with common voltage Vcom. The common voltage Vcom is intermediate potential between a driving voltage Vdmin at low level and a driving voltage Vdmin at low level and a driving voltage Vdmax at high level, both of which are applied to the video signal line DL.

(Gate Terminal GTM)

FIGS. 1(A) and 1(B) present a connection structure from the scanning signal line GL of the display matrix to a gate terminal GTM standing for its external connection terminal, FIG. 1(A) showing a plan view and FIG. 1(B) a cross section taken along the line B—B of FIG. 1(A). Incidentally, FIGS. 1(A) and 1(B) depict the neighborhood of the left end of the lower transparent glass substrate SUB1 in the matrix of FIG. 5.

Letter AO designates a photolithographic mask pattern, namely, a photo resist pattern for selective anodization. Therefore, this photo resist is anodized and then removed so that the shown mask pattern AO is not left as a complete but remains as a trace because the anodized oxide film AOF is selectively formed in the gate line GL, as shown in section. With reference to the boundary line AO of the photo resist in the plan view, the left hand side is a region which is covered with the resist and is not anodized, whereas the right hand side is a region which is clear of the resist and is anodized. The anodized second conductive film g2 has its surface formed with its oxide $Al_2O_3$ film or anodized oxide film AOF and its lower conductive portion reduced in volume. Of course, the anodization is so carried out for a proper time and at a proper voltage that the conductive portion may be left. The mask pattern AO is made to intersect the scanning line GL not in a straight line but in a folded crank shape. Therefore, even if exfoliation begins at a photo resist portion intersecting the stepped shape of the scanning signal line GL and fusion of the second conductive film g2 due to anodization voltage takes place, the fusion will proceed along end surface of the photo resist film and consequently the fusion of the second conductive film g2 will stop at the crank shape portion. Accordingly, the scanning signal line GL can be prevented from being disconnected during anodization.

In the present embodiment, the photo resist pattern on the second conductive film g2 is formed to take the crank shape but this shape is not limitative. In essentially, any shapes which can stop progression of exfoliation generated in the photo resist pattern may suffice and a rectangular shape, a triangular shape or a trapezoidal shape may be employed by itself or in combination.

The second conductive film g2, as shown at (A) in the Figure, is hatched for easy understanding, but the region hot anodized is patterned in a comb shape. This intends to suppress the probability of the line breakage and the degradation of conductivity to the minimum while preventing formation of any whiskers, by narrowing the width of each tooth and bundling a plurality of teeth in parallel, because the whisker will occur in the surface when the width of the second conductive film g2 is large. In the present liquid crystal display device, therefore, a portion corresponding to the root of the comb is displaced along the mask pattern AO.

The gate terminal GTM is formed of the first conductive film g1 made of a Cr film g1 having excellent adhesiveness to the silicon oxide film SID and the transparent first conductive film d1 protecting the surface of the Cr film g1 and having the same level (belonging to the same layer and formed simultaneously) as the transparent pixel electrode ITO1. Incidentally, the second and third conductive films d2 and d3 formed on the gate insulating film GI and at the side thereof are left as a result that regions of the second and first conductive films g2 and g1 are covered with the photo resist so that they may not be etched off in the presence of pin holes or the like at the time of etching the third and second conductive films d3 and d2. Moreover, the first conductive film d1 extending rightward to go beyond the gate insulating film GI is provided for further completing similar countermeasures.

In the plan view, the gate insulating film GI is formed rightward of its boundary, a passivation film PSV1 is also formed rightward of its boundary, and the terminal portion GTM at the lefthand and clears out of them to come into electric contact with the external circuits. Only the pair of the gate line GL and the gate terminal GTM is shown but practically a plurality of pairs are juxtaposed vertically in the Figure, and the gate terminals GTM have their ends, on the left in the Figure, are extended during the fabrication process to go beyond the cut region of the lower transparent glass substrate SUB1 and are short-circuited. This short-circuiting accomplished during the fabrication process is useful for supplying electric power at the anodizing time and for preventing the electrostatic breakdown at the time of rubbing the orientation film ORI1.

(Drain Terminal DTM)

FIGS. 10(A) and 10(B) are diagrams showing the connection from the video signal line DL to its external connection terminal represented by the drain terminal DTM, presenting, FIG. 10(A) showing a plan view and FIG. 10(B) a cross section taken along the line B—B of FIG. 10(A). Incidentally, FIGS. 10(A) and 10(B) correspond to the upper and lower ends of the lower transparent glass substrate SUB1 in the matrix of FIG. 5, and the left end direction corresponds to the upper or lower end of the lower transparent glass substrate SUB1, although the direction of the drawing is changed for convenience.

Letter TSTd designates a test terminal which is not connected with any external circuits. A plurality of test terminals TSTd and a plurality of drain terminals DTM are alternately arrayed vertically in staggered fashion, and the test terminal TSTd terminates without reaching the end portion of the lower transparent glass substrate SUB1, as shown. But, the drain terminals DTM are further extended to go beyond the cut line of the lower transparent glass substrate SUB1 so that all of them may be short-circuited to each other so as to prevent any electrostatic breakdown during the fabrication step. In the Figure, the drain terminals DTM are so connected as to interdigitate with a matrix of the video signal lines DL, in which the test terminal TSTd are present, whereas the test terminals TSTd are so connected as to interdigitate with a matrix of the video signal lines DL, in which the drain terminals DTM are present.

By reason similar to that for the gate terminal GTM, the drain terminal DTM is formed of two layers, i.e., the first conductive film g1 of Cr film and the first conductive film d1 of ITO film and is connected with the video signal line DL through a portion removed of the gate insulating film GI. The semiconductor layer AS formed on the end portion of the gate insulating film GI is provided for taperingly etching the edge of the gate insulating film GI. For connection with an external circuit, the passivation film PSV1 on the drain terminal DTM is naturally removed. Letter AO designates the aforementioned anodizing mask which has its boundary formed to enclose the entirety of the matrix. In the Figure, the lefthand side of the boundary of the anodizing mask AO is covered with the mask, but the remaining uncovered portion has no second conductive film g2 so that it has no relation to the pattern.

(Structure of Latching Capacitor Cadd)

The transparent pixel electrode ITO1 is formed to overlap the adjoining scanning signal line GL at one end opposite to the other end connected with the thin film transistor TFT. This superposition constitutes a latching capacity element (or an electrostatic capacity element) Cadd which uses the transparent pixel electrode ITO as its one electrode PL2 and the adjoining scanning signal line GL as its other electrode PL1, as is apparent from FIG. 4. This latching capacity element Cadd has its dielectric film formed of: the insulating film GI used as the gate insulating film of the thin film transistor TFT; and the anodized film AOF.

The latching capacitor Cadd is formed at a widened portion of the second conductive film g2 of the scanning signal line GL, as is apparent from FIG. 6. Here, the second conductive film g2 is thinned at its portion intersecting the video signal line DL to reduce the probability of the short-circuiting with the video signal line DL. Even if the transparent pixel electrode ITO1 is broken at a stepped portion of the electrode PL1 of the latching capacitor Cadd, its defect is compensated by an island region which is constructed of the second conductive film d2 and the third conductive film d3 to bridge that step. This island region is made to be as small as possible in order for aperture not to be lowered.

(Equivalent Circuit of Whole Display Device)

Figure 11:
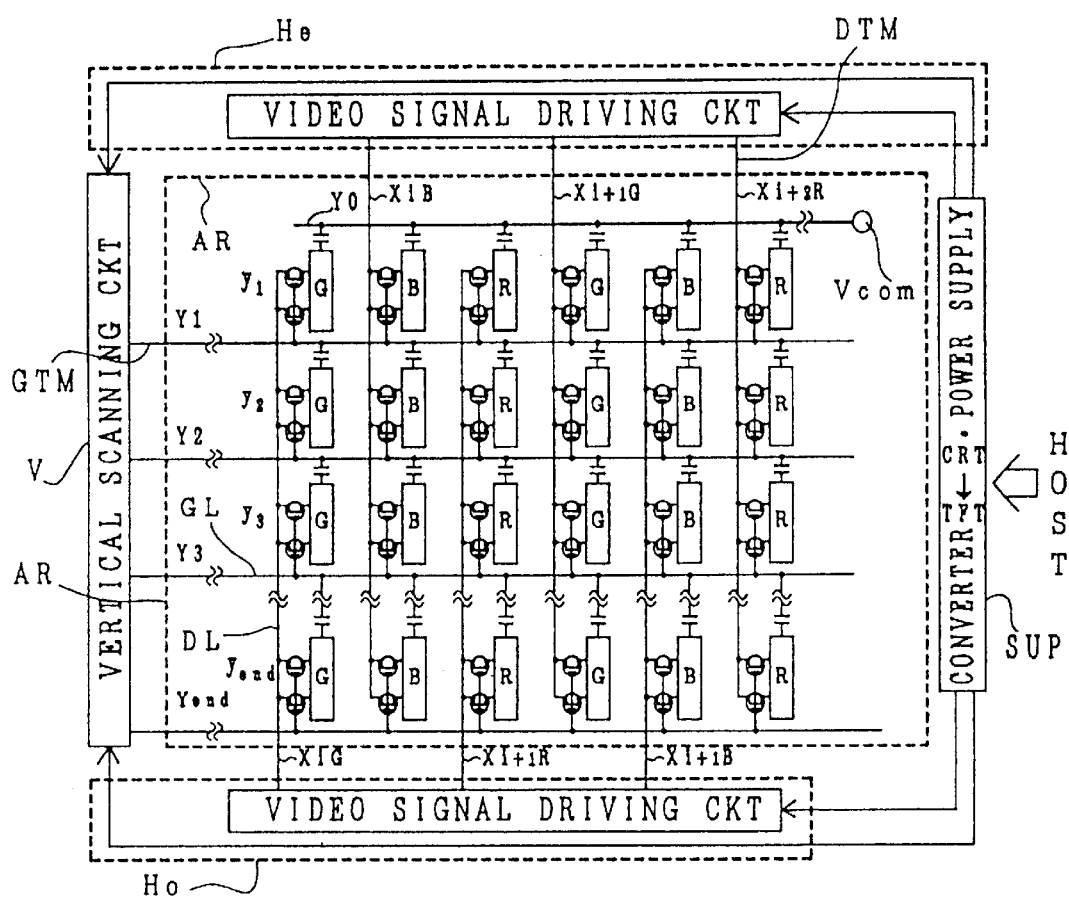
FIG. 11 is an equivalent circuit diagram showing a liquid crystal display of a color liquid crystal display device of active matrix type.

FIG. 11 shows an equivalent circuit diagram of the display matrix portion and a wiring diagram of its peripheral circuits. Although this drawing is a circuit diagram, it is depicted in a manner to correspond to a practical geometric disposition. Letter AR designates a matrix array formed by disposing a plurality of pixels two-dimensionally.

In the drawing, letter X designates the video signal line DL, and suffixes G, B and R are added to correspond to green, blue and red pixels, respectively. Letter Y designates the scanning signal line GL, and suffixes 1, 2, 3, - - - , end are added in accordance with the sequence of the scanning timing.

The video signal lines X (whose suffix is omitted) are alternately connected with an upper (or odd-numbered) video signal driving circuit He and with a lower (or even-numbered) video signal driving circuit Ho.

The scanning signal lines Y (whose suffix is omitted) are connected with a vertical scanning circuit V.

Letter SUP designates a circuit which includes a power supply circuit for obtaining a plurality of divided and stabilized voltage sources from one voltage source, and a circuit for converting data for CRT (i.e., Cathode Ray Tube) from a host (i.e., a higher-order operational processor) into data for the TFT liquid crystal display device.

(Equivalent Circuit of Latching Capacitor Cadd and its Operation)

Figure 12:
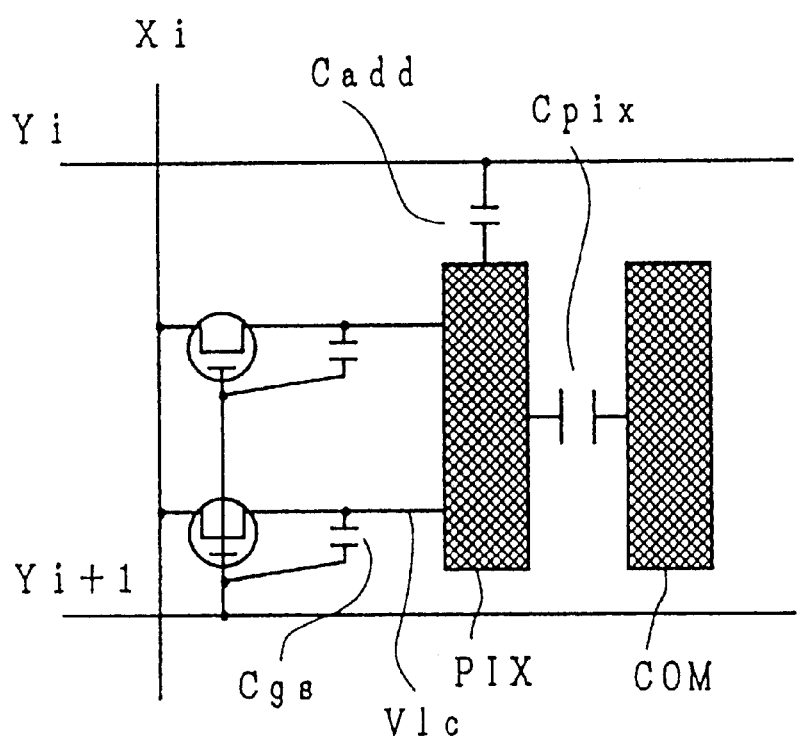
FIG. 12 is an equivalent circuit diagram showing one pixel shown in FIG. 2.

An equivalent circuit of the pixel shown in FIG. 2 is shown in FIG. 12. In FIG. 12, letter Cgs designates a parasitic capacitor to be formed between the gate electrode GT and the source electrode SD1 of the thin film transistor TFT. The parasitic capacitor Cgs has its dielectric film made of the insulating film GT and the anodized oxide film AOF. Letter Cpix designates a liquid crystal capacitor to be formed between the transparent pixel electrode ITO1 (or PIX) and the common transparent pixel electrode ITO2 (or COM). The dielectric film of the liquid crystal capacitor Cpix is formed of the liquid crystal LC, the passivation film PSV1 and the alignment films ORI1 and ORI2. Letter V1c designates center potential.

The latching capacity element Cadd functions to reduce the influence of a change of gate potential ΔVg upon the center potential (e.g., the pixel electrode potential) V1c when the thin film transistor TFT switches, as expressed by the following formula:

$$\Delta V1c = \{Cgs/(Cgs+Cadd+Cpix)\} \times \Delta Vg,$$

wherein ΔV1c indicates a change of the center potential due to ΔVg. This change ΔV1c causes DC component to be added to the liquid crystal LC but can be reduced by increasing the latching capacitor Cadd. Moreover, the latching capacitor Cadd functions to elongate the discharge time and stores video information for a long time after the thin film transistor TFT is tuned off. A decrease in DC component to be applied to the liquid crystal LC can improve the lifetime of the liquid crystal LC, to reduce the so-called "printing", by which the preceding image is left at the time of switching the liquid crystal display frame.

Since the gate electrode GT is enlarged to such an extent as to cover the i-type semiconductor layer AS completely, as has been described hereinbefore, its area overlapping the source electrode SD1 and the drain electrode SD2 is increased correspondingly to cause an adverse effect that the parasitic capacity Cgs is increased to make the center potential V1c liable to be influenced by the gate (scanning) signal Vg. However, this demerit can be eliminated by providing the latching capacitor Cadd.

In the light of the write characteristic of the pixel, the latching capacity of the latching capacitor Cadd is set to a level about four to eight times as large as that of the liquid crystal capacity Cpix (4 Cpix<Cadd<8 Cpix) and about eight to thirty-two times as large as that of the parasitic capacity Cgs (8 Cgs<Cadd<32 Cgs).

(Method of Connecting Electrode Line of Latching Capacitor Cadd)

The initial stage scanning signal line GL (i.e., $Y_0$) to be used only as a latching capacitor electrode line is connected to the common transparent pixel electrode ITO2 (Vcom), as shown in FIG. 11. Since the common transparent pixel electrode ITO2 of the upper transparent glass substrate SUB2 is connected, at the peripheral edge of the liquid crystal display device, to the external outgoing wiring of the lower transparent glass substrate SUB1 by the silver paste member as described previously, the initial stage scanning signal line GL ($Y_0$) may be connected to that external outgoing wiring on the side of the lower transparent glass substrate SUB1. Alternatively, the initial stage latching capacitor electrode line $Y_0$ may be connected with the final stage scanning signal line Yend or a DC potential point (or AC ground point) other than the Vcom, or may be connected to receive one surplus scanning pulse $Y_0$ from the vertical scanning circuit V.

(Manufacturing Process)

Next, a process for manufacturing the lower transparent glass substrate SUB1 of the aforementioned liquid crystal display device will be described with reference to FIGS. 13 to 15. In these Figures, the central letters are short for the step names, and the lefthand side shows the pixel portion shown in FIG. 3 whereas the righthand side shows the process flow, as viewed in section from the vicinity of the gate terminal shown in FIGS. (A) and (B). Steps A to I excepting Step D are defined to correspond to the individual photolithographic steps, and any sectional diagrams of the individual steps indicate the phase at which the photo resist is removed after the photolithographic treatments. Incidentally, the photolithographic treatments are intended in the present description to imply a series of operations from the application of photo resist to the development through a selective exposure using a mask, and their repeated description will be omitted. A description will now be given in accordance with the thus defined steps.

Figure 13:
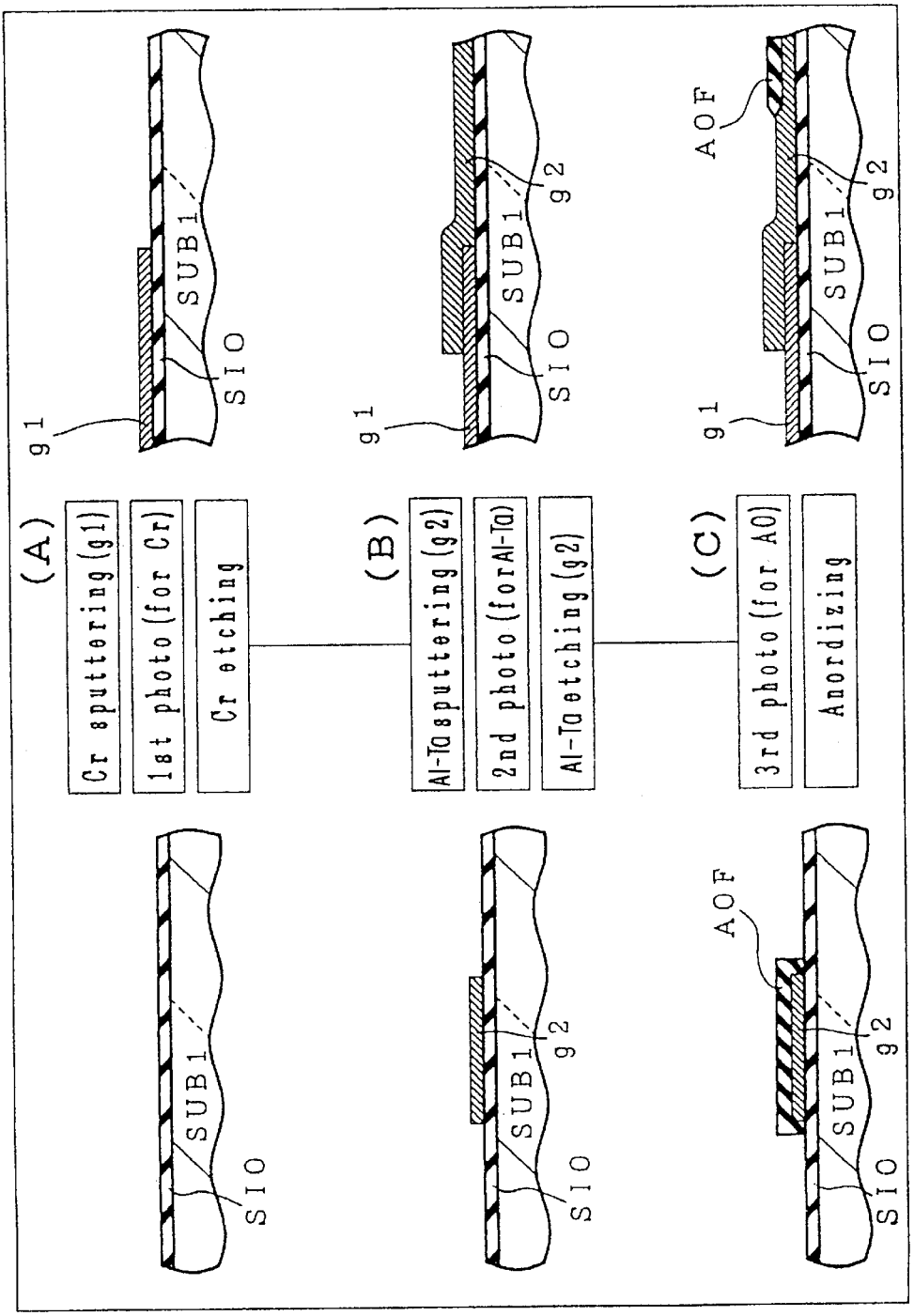
FIG. 13 presents a flow chart showing sections of a pixel portion and a gate terminal portion and shows fabrication steps A to C on the side of a lower transparent glass substrate SUB1.

Step A (FIG. 13)

A silicon dioxide film SIO is deposited by the dip treatment on both surfaces of a lower transparent glass substrate SUB1 made of 7059 glass (under the trade name), and then a resulting structure is baked at 500° C. for 60 minutes. A first conductive film g1 consisting of an about 1,000 angstrom-thick chromium film is deposited on the lower transparent glass substrate SUB1 by sputtering. After the photolithographic treatment, the first conductive film g1 is etched selectively by etching using a ceric ammonium nitrate solution as an etching solution, thereby forming a gate terminal GTM, a drain terminal DTM, an anodization bus line (not shown) for connecting the gate terminal GTM, a bus line (not shown) for short-circuiting the drain terminals DTM, and an anodization pad (not shown) connected to the anodization bus line.

Step B (FIG. 13)

A second conductive film g2 having a thickness of about 3,000 angstroms and made of Al—Ta is formed by sputtering. After the photolithographic treatment, the second conductive film g2 is selectively etched with a mixed acid solution of phosphoric acid, nitric acid and glacial acetic acid.

Step C (FIG. 13)

After the photolithographic treatment (i.e., after the formation of the aforementioned anodized mask AO), the lower transparent glass substrate SUB1 is dipped in an anodizing liquid which is prepared by diluting a solution containing 3% of tartaric acid adjusted to PH 7±0.5 with a solution of ethylene glycol at a ratio of 1:9, and the anodizing current density is adjusted to 0.5 mA/cm² (for anodization at constant current). Next, an anodization is carried out till an anodization voltage of 144 V necessary for obtaining a predetermined thickness of $Al_2O_3$ film is reached. After this, the substrate SUB1 is desirably held in this state for several to several of tens of minutes (for anodization at constant voltage). This is important for achieving a uniform anodized oxide film AOF. Thus, the second conductive film g2 is anodized to form an anodized oxide film AOF having a thickness of 2,000 angstroms on the scanning signal line GL, the gate electrode GT and the electrode PL1.

Figure 14:
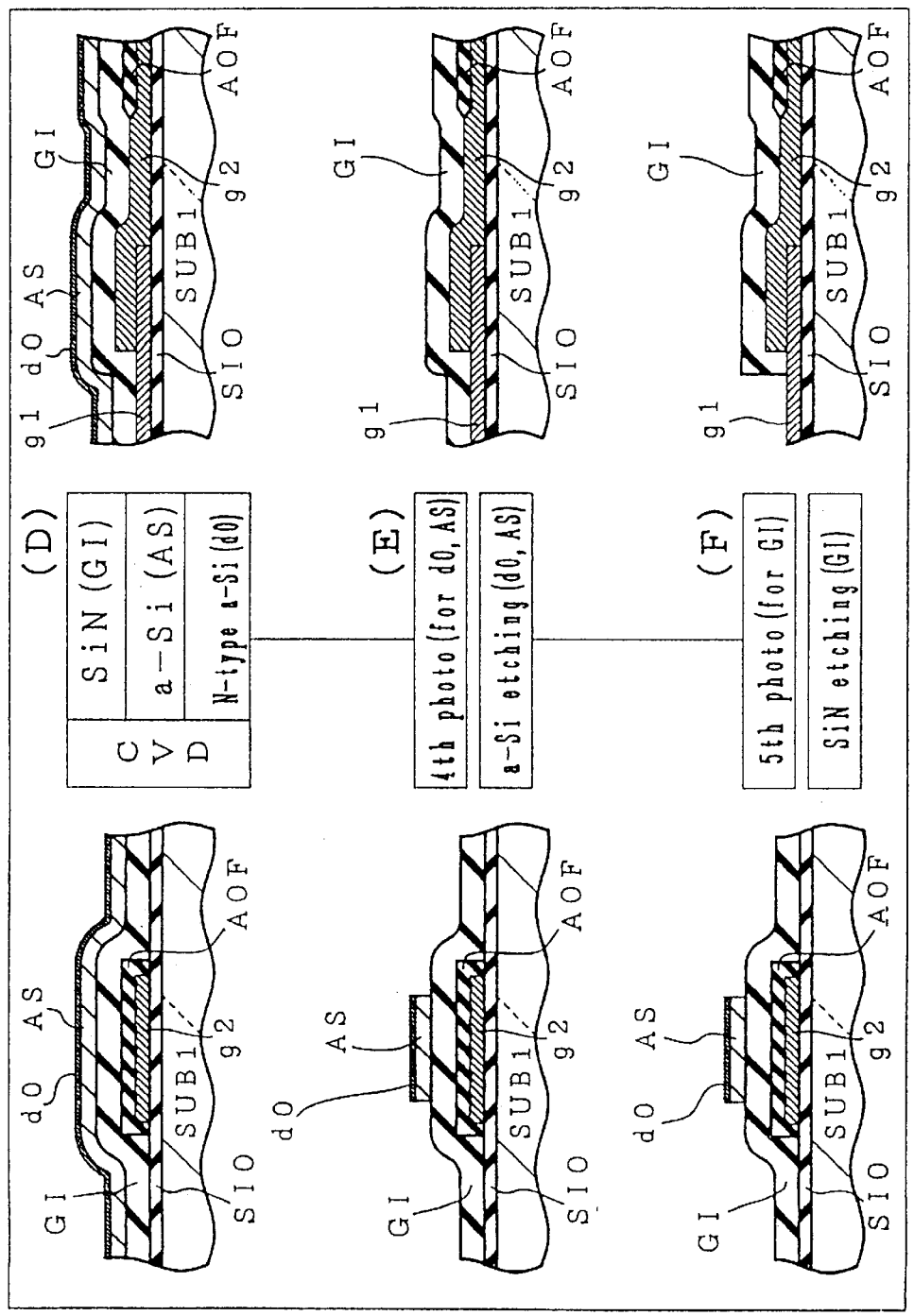
FIG. 14 presents a flow chart showing sections of the pixel portion and the gate terminal portion and shows fabrication steps D to F on the side of the lower transparent glass substrate SUB1.

Step D (FIG. 14)

Ammonia gas, silane gas and nitrogen gas are introduced into a plasma CVD apparatus to form a Si nitride film having a thickness of 2,000 angstroms, and silane gas and hydrogen gas are introduced into the plasma CVD apparatus to form an i-type amorphous Si film having a thickness of 2,000 angstroms. After this, hydrogen gas and phosphine gas are introduced into the plasma CVD apparatus to form an N(+)-type amorphous Si film having a thickness of 300 angstroms.

Step E (FIG. 14)

After the photolithography, the N(+)-type amorphous Si film and the i-type amorphous Si film are selectively etched by using $SF_6$ and $CCl_4$ as dry etching gas to from an island of an i-type semiconductor layer AS.

Step F (FIG. 14)

After the photolithography, the Si nitride film is selectively etched by using $SF_6$ as dry etching gas.

Figure 15:
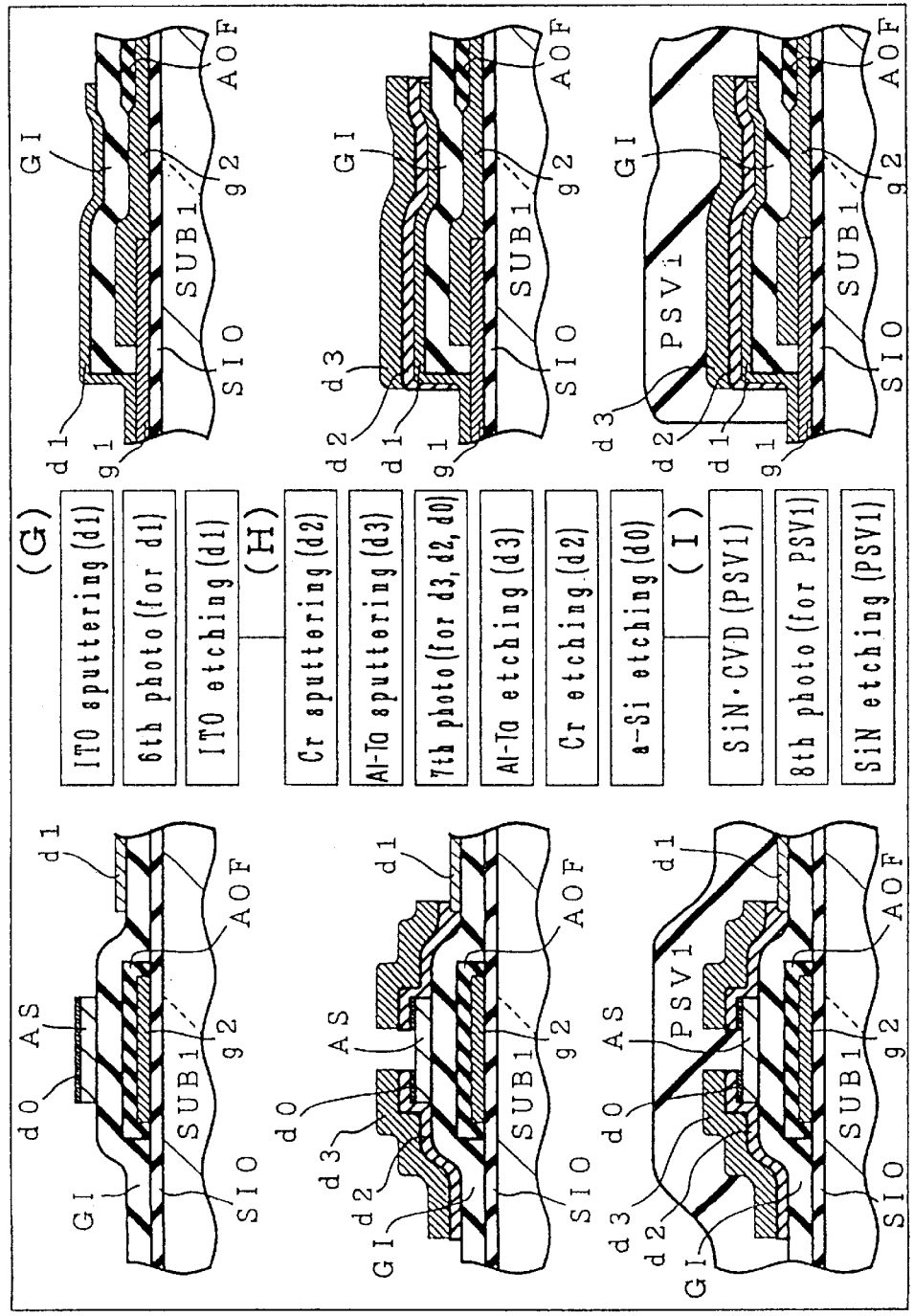
FIG. 15 presents a flow chart showing sections of the pixel portion and the gate terminal portion and shows fabrication steps g to I on the side of the lower transparent glass substrate SUB1.

Step G (FIG. 15)

A first conductive film d1 formed of an ITO film having a thickness of 1,000 angstroms is formed by sputtering. After the photolithography, the first conductive film d1 is selectively etched by using a mixed acid solution of hydrochloric acid and nitric acid as etching solution, to form the uppermost layers of the gate electrode GTM and drain terminal DTM and the transparent pixel electrode ITO1.

Step H (FIG. 15)

A second conductive film d2 of Cr having a thickness of 1,000 angstroms is formed by sputtering, and a third conductive film d3 Al—Ta having a thickness of 4,000 angstroms is formed by sputtering. After the photolithography, the third conductive film d3 is etched by a solution similar to that of Step B, and the second conductive film d2 is etched by a solution similar to that of Step A, to form the video signal line DL, the source electrode SD1 and the drain electrode SD2. Next, $CCl_4$ and $SF_6$ are introduced into a dry etching apparatus to etch the N(+)-type amorphous Si film thereby to selectively remove a portion of N(+)-type semiconductor layer d0 between the source and the drain.

Step I (FIG. 15)

Ammonia gas, silane gas and nitrogen gas are introduced into the plasma CVD apparatus to form a Si nitride film having a thickness of 1 micron. After the photolithography, the Si nitride film is selectively etched by a photoetching technique using $SF_6$ as dry etching gas, to form the passivation film PSV1.

Figure 18:
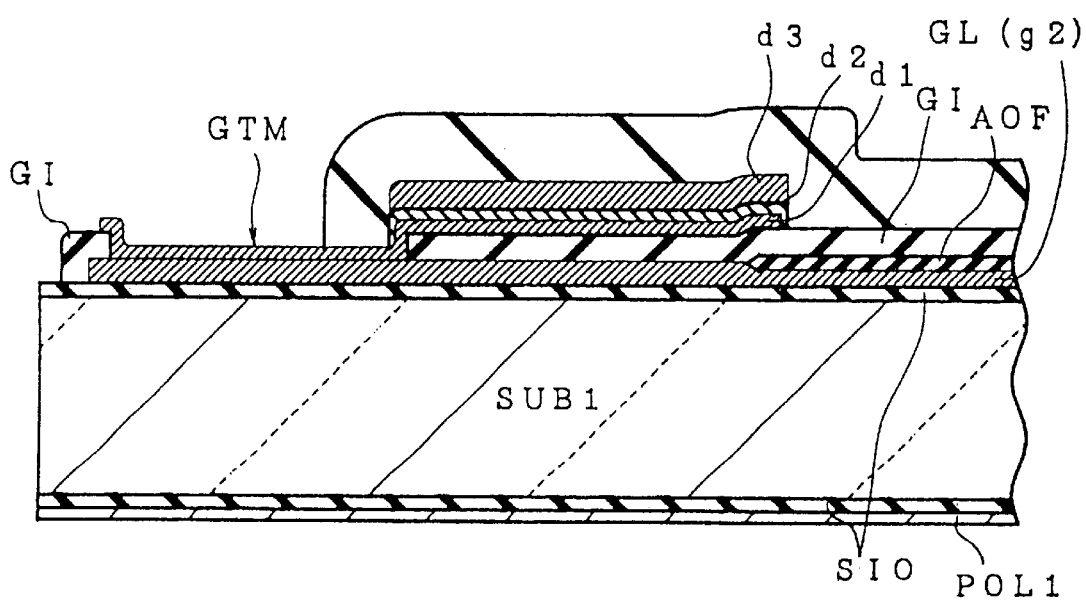
FIG. 18 is a section showing a gate terminal portion of another thin film transistor substrate of liquid crystal display device according to the invention.

FIG. 18 is a section showing a gate terminal portion of another thin film transistor substrate of liquid crystal display device according to the present invention. In this thin film transistor substrate, a gate terminal GTM is formed of a second conductive film g2 of Al—Ta, having its side covered with an insulating film GI and its top covered with a first conductive film d1. Consequently, the first conductive film d1 need not undergo sputtering and etching and therefore the fabrication process can be shortened. Further, since Al—Ta is less corrodible than pure Al and besides the gate terminal GTM is covered with the insulating film GI and first conductive film d1, the gate terminal GTM will not come in touch with the air so as to be prevented from being damaged owing to corrosion.

In the embodiment described as above, the Al—Ta film is used as the second and third conductive films g2 and d3 but in place of the Al—Ta film, an Al—Ti film may be used. In this case, too, since no hillock takes place and no residue is generated after etching and besides the anodized oxide film AOF has a high breakdown voltage, the fabrication yield can be improved by 5% and the reliability can be promoted. The improved fabrication yield can then eliminate complexity of fabrication process, thus reducing the cost of production.

(Range of Application)

The invention achieved by the present inventor has been described specifically by making reference to the embodiments but the present invention is in no way limited to the foregoing embodiments and obviously can be changed or altered in various ways within the framework of the invention.

For example, the foregoing embodiments have been described by way of the thin film transistor substrate of liquid crystal display device expected to bring about the most significant mass production effect but the present invention is not limited thereto and may also be applied to a thin film transistor substrate of close contact type photosensor, electroluminescent display apparatus or the like. In the foregoing embodiments, each of the second and third conductive films g2 and d3 is formed of an Al—Ta or Al—Ti film but alternatively, it may be formed of an Al—Ta-Ti film. In the foregoing embodiments, the anodized oxide film AOF and insulating film GI are used as gate insulating film but the gate insulating layer may be formed of the anodized oxide film AOF alone. While in the foregoing embodiments a silicon nitride film is used as insulating film GI, a silicon oxide film may be used for this purpose. In the foregoing embodiments, the anodized oxide film AOF has a thickness of 2,000 angstroms but due to the fact that a maximum voltage of about 25V is applied between the gate electrode GT and each of the source electrode SD1 and drain electrode SD2, an anodized oxide film AOF having a thickness of more than 500 angstroms may suffice. In the foregoing embodiments, the individual pixels are arranged in line but they may be staggered by half the pitch. Further, the latching capacitor Cadd is provided in the foregoing embodiments but in an alternative it may be omitted. The first conductive film g1 is formed of the Cr film in the foregoing embodiments but it alternatively be formed of a Ta film. Finally, while in the foregoing embodiments the anodizing mask AO is applied, only a portion to be anodized may be dipped in an anodizing solution.

As has been described so far, in the thin film transistor substrate, liquid crystal display panel and liquid crystal display device according to the present invention, no hillock takes place, no residue is generated after etching, and the anodized oxide film has a high breakdown voltage. As a result, the fabrication yield and reliability can be improved and the improved fabrication yield can eliminate complexity of fabrication process to reduce the cost of production, thus demonstrating beneficial effects of the present invention.

What is claimed is:

1. An active matrix display device comprising a plurality of pixels arranged in matrix and each having a pixel electrode and a thin film transistor,
    said thin film transistor including:
        a gate electrode electrically connected to a scanning signal line;
        a first insulating film formed on said gate electrode;
        a semiconductor layer formed above said first insulating film;
        a source electrode formed on said semiconductor layer and electrically connected to said pixel electrode; and
        a drain electrode formed on said semiconductor layer and electrically connected to a video signal line,
        wherein each of said scanning signal line and said gate electrode is made of an alloy of Al containing Ta, and a second insulating film formed of an anodized oxide film of said scanning signal line or said gate electrode is formed on the surface of at least one of said scanning signal line and said gate electrode.

2. An active matrix display device according to claim 1 wherein the additive amount of Ta in said Al alloy is 0.5 to 2.5 at %.

3. An active matrix display device according to claim 1 wherein said second insulating layer has a thickness of 1,000 angstroms or more for prevention or breakdown.

4. An active matrix display device according to claim 1 wherein said gate electrode is insulated from said semiconductor layer by said second and first insulating films.

5. An active matrix display device according to claim 4 wherein a silicon nitride film is used as said first insulating film.

6. An active matrix display device according to claim 1 wherein said scanning signal line is insulated from said video signal line at a cross portion therebetween by said second and first insulating films and said semiconductor layer.

7. An active matrix display device according to claim 1 wherein each of said plurality of pixels further comprises a capacity element, said capacity element includes a first electrode electrically connected to said pixel electrode, a dielectric film and a second electrode electrically connected to a scanning signal line associated with a pixel adjacent to a pixel of interest, said second electrode is made of an alloy of Al containing Ta, and said dielectric film is formed of an anodized oxide film on the surface of said second electrode.

8. An active matrix display device according to claim 1 wherein each of said plurality of pixels further comprises a capacity element, said capacity element includes a first electrode electrically connected to said pixel electrode, a dielectric film and a second electrode electrically connected to a scanning signal line associated with a pixel adjacent to a pixel of interest, said second electrode is made of an alloy of Al containing Ta, and said dielectric film is formed of said first insulating film and an anodized oxide film formed on the surface of said second electrode.

9. An active matrix display device according to claim 1 wherein said video signal line is made of an alloy of Al containing Ti.

10. An active matrix display device according to claim 1 wherein said semiconductor layer is made of amorphous silicon.

11. An active matrix display device according to claim 1, wherein said second insulating layer has a thickness in a range of 500–2000 angstroms.

12. An active matrix display device according to claim 11, wherein said second insulating layer has a thickness in a range of 1300–2000 angstroms.

13. An active matrix display device comprising a plurality of scanning signal lines extending in a first direction, a plurality of video signal lines extending in a second direction, and pixels each including a pixel electrode and a thin film transistor, each pixel being disposed in a region surrounded by one of said plurality of scanning signal lines, a scanning signal line adjacent thereto, one of said plurality of video signal lines and a video signal line adjacent thereto, said thin film transistor having its gate electrode, source electrode and drain electrode electrically connected to corresponding scanning signal line, pixel electrode and video signal line, respectively, said scanning signal line and said gate electrode being each made of a metal containing Al as main constituent, and an anodized oxide film of said scanning signal line or said gate electrode being formed on a surface of at least one of said scanning signal line and said gate electrode, wherein a metal containing Al as main constituent is used as a material of a gate terminal connected with said scanning signal line, the side of said gate terminal is covered with an insulating film, and the top of said gate terminal is covered with a different conductive film of a material different from that of said gate terminal.

14. An active matrix display device according to claim 13 wherein said gate terminal contains Ta.

15. An active matrix display device according to claim 13 wherein an additive amount of Ta in said gate electrode is 0.5 to 2.5 at %.

16. An active matrix display device according to claim 13 wherein said gate electrode contains Ti.

17. An active matrix display device according to claim 13 wherein said gate terminal is covered with a transparent conductive film.

18. An active matrix display device comprising a plurality of scanning signal lines extending in a first direction, a plurality of video signal lines extending in a second direction, and pixels each including a pixel electrode and a thin film transistor, each pixel being disposed in a region surrounded by one of said plurality of scanning signal lines, a scanning signal line adjacent thereto, one of said plurality of video signal lines and a video signal line adjacent thereto, said thin film transistor having its gate electrode, source electrode and drain electrode electrically connected to corresponding scanning signal line, pixel electrode and video signal line, respectively, said scanning signal line and said gate electrode being each made of a metal containing Al as main constituent, and an anodized oxide film of said scanning signal line or said gate electrode being formed on the surface of at least one of said scanning signal line and said gate electrode, wherein said video signal line is made of an alloy of Al containing Ta.

19. An active matrix display device according to claim 18 wherein said video signal line further contains Ti.

20. An active matrix display device comprising a plurality of scanning signal lines extending in a first direction, a plurality of video signal lines extending in a second direction, and pixels each including a pixel electrode and a thin film transistor, each pixel being disposed in a region surrounded by one of said plurality of scanning signal lines, a scanning signal line adjacent thereto, one of said plurality of video signal lines and a video signal line adjacent thereto, said thin film transistor having its gate electrode, source electrode and drain electrode electrically connected to a corresponding scanning signal line, a corresponding pixel electrode and a corresponding video signal line, respectively, said scanning signal line and said gate electrode being each made of a metal containing Al as the main constituent, wherein a gate terminal connected with said scanning signal line is comprised of a metal containing Al as the main constituent, wherein a side wall surface of said gate terminal is overlaid with an insulating film and wherein an upper surface of said gate terminal exposed from said insulating film is overlaid with a transparent conductive film.

21. An active matrix display device according to claim 20, wherein said gate terminal contains Ta.

22. An active matrix display device according to claim 21, wherein the additive amount of Ta in said gate terminal is 0.5 to 2.5 at %.

23. An active matrix display device according to claim 20, wherein said gate terminal contains Ta and Ti.

24. An active matrix display device comprising a plurality of scanning signal lines extending in a first direction, a plurality of video signal lines extending in a second direction, and pixels each including a pixel electrode and a thin film transistor, each pixel being disposed in a region surrounded by one of said plurality of scanning signal lines, a scanning signal line adjacent thereto, one of said plurality of video signal lines and a video signal line adjacent thereto, said thin film transistor having its gate electrode, source electrode and drain electrode electrically connected to a corresponding scanning signal line, a corresponding pixel electrode and a corresponding video signal line, respectively, said scanning signal line and said gate electrode being each-made of a metal containing Al as the main constituent, wherein a gate terminal connected with said scanning signal line is comprised of a metal containing Al—Ta, and wherein said gate terminal is overlaid with a transparent conductive film.

25. An active matrix display device according to claim 20, wherein a gate insulating film of said thin film transistor is comprised of silicon nitride insulating film.

26. An active matrix display device according to claim 20, wherein a gate insulating film of said thin film transistor is comprised of an anodized oxide film and a silicon dioxide insulating film.

27. An active matrix display device according to claim 20, wherein the pixels are arranged in lines.

28. An active matrix display device according to claim 20, wherein the pixels are staggered in relation to one another.

29. An active matrix display device comprising a plurality of scanning signal lines extending in a first direction, a plurality of video signal lines extending in a second direction, and pixels each including a pixel electrode and a thin film transistor, each pixel being disposed in a region surrounded by one of said plurality of scanning signal lines, a scanning signal line adjacent thereto, one of said plurality of video signal lines and a video signal line adjacent thereto, said thin film transistor having its gate electrode, source electrode and drain electrode electrically connected to a corresponding scanning signal line, a corresponding pixel electrode and a corresponding video signal line, respectively, said scanning signal line and said gate electrode being each made of a metal containing Al as the main constituent, wherein a gate terminal connected with said scanning signal line is comprised of a metal containing Al—Ta, wherein a side wall surface of said gate terminal is overlaid with an insulating film and wherein an upper surface of said gate terminal exposed from said insulating film is overlaid with a transparent conductive film.

30. An active matrix display device according to claim 29, wherein the additive amount of Ta in said gate terminal is 0.5 to 2.5 at %.

31. An active matrix display device according to claim 29, wherein said gate terminal contains Ta and Ti.

32. An active matrix display device comprising a plurality of scanning signal lines extending in a first direction, a plurality of video signal lines extending in a second direction, and pixels each including a pixel electrode and a thin film transistor, each pixel being disposed in a region surrounded by one of said plurality of scanning signal lines, a scanning signal line adjacent thereto, one of said plurality of video signal lines and a video signal line adjacent thereto, said thin film transistor having its gate electrode, source electrode and drain electrode electrically connected to a corresponding scanning signal line, a corresponding pixel electrode and a corresponding video signal line, respectively, said scanning signal line and said gate electrode being each made of a metal containing Al as the main constituent, and said scanning signal line being connected to a gate terminal, wherein said active matrix display device further includes means for preventing said gate terminal from corroding, including the gate terminal being comprised of Al—Ta and an upper surface of the gate terminal being overlaid with a transparent conductive film.

33. An active matrix display device according to claim 32, wherein said means for preventing said gate terminal from corroding includes a side surface of the gate terminal being overlaid with an insulating film.

* * * * *